United States Patent
Cassidy et al.

(10) Patent No.: US 10,416,846 B2
(45) Date of Patent: Sep. 17, 2019

(54) DETERMINING GRAPHICAL ELEMENT(S) FOR INCLUSION IN AN ELECTRONIC COMMUNICATION

(71) Applicant: Google LLC, Mountain View, CA (US)

(72) Inventors: Ryan Cassidy, Seattle, WA (US); Utkarsh Srivastava, Palo Alto, CA (US); Anton Volkov, San Francisco, CA (US); John Patrick McGregor, Jr., Menlo Park, CA (US)

(73) Assignee: Google LLC, Mountain View, CA (US)

( * ) Notice: Subject to any disclaimer, the term of this patent is extended or adjusted under 35 U.S.C. 154(b) by 53 days.

(21) Appl. No.: 15/350,040

(22) Filed: Nov. 12, 2016

(65) Prior Publication Data
US 2018/0136794 A1 May 17, 2018

(51) Int. Cl.
*G06F 3/0482* (2013.01)
*G06F 17/27* (2006.01)
(Continued)

(52) U.S. Cl.
CPC .......... *G06F 3/0482* (2013.01); *G06F 3/0488* (2013.01); *G06F 3/04817* (2013.01); *G06F 3/04842* (2013.01); *G06F 3/04886* (2013.01); *G06F 17/276* (2013.01); *G06Q 50/01* (2013.01); *H04L 51/22* (2013.01); *G06F 3/015* (2013.01);
(Continued)

(58) Field of Classification Search
CPC ............................... G06F 3/0482; G06F 17/27
See application file for complete search history.

(56) References Cited

U.S. PATENT DOCUMENTS 6,092,102 A 7/2000 Wagner
7,603,413 B1 10/2009 Herold et al.
(Continued)

FOREIGN PATENT DOCUMENTS

CN 1475908 2/2004
CN 102222079 10/2011
(Continued)

OTHER PUBLICATIONS

European Patent Office—International Searching Authority; Notification of Transmittal of the International Search Report and the Written Opinion of PCT Serial No. PCT/US2017/052713; dated Dec. 5, 2017.
(Continued)

*Primary Examiner* — David E Choi
(74) *Attorney, Agent, or Firm* — IP Spring

(57) ABSTRACT

Methods, apparatus, and computer readable media related to determining graphical element(s) (e.g., emojis, GIFs, stickers) for inclusion in an electronic communication being formulated by a user via a computing device of the user, and providing the graphical element(s) for inclusion in the electronic communication. For example, the graphical element(s) may be provided for presentation to the user via a display of the computing device of the user and, in response to user interface input directed to one of the graphical element(s), that graphical element may be incorporated in the electronic communication. In various implementations, the electronic communication is a communication to be submitted as part of a dialog that involves the user and one or more additional users.

17 Claims, 15 Drawing Sheets

(51) Int. Cl.
    *H04L 12/58*     (2006.01)
    *G06F 3/0488*     (2013.01)
    *G06Q 50/00*     (2012.01)
    *G06F 3/0481*     (2013.01)
    *G06F 3/0484*     (2013.01)
    *G06F 3/0489*     (2013.01)
    *G06F 3/01*     (2006.01)
    *G06F 3/023*     (2006.01)

(52) U.S. Cl.
    CPC ........ *G06F 3/0237* (2013.01); *G06F 3/04895* (2013.01)

(56) References Cited

U.S. PATENT DOCUMENTS

| | | |
|---|---|---|
| 8,391,618 B1 | 3/2013 | Chuang et al. |
| 8,423,577 B1 | 4/2013 | Lee et al. |
| 8,515,958 B2 | 8/2013 | Knight |
| 8,554,701 B1 | 10/2013 | Dillard et al. |
| 8,589,407 B2 | 11/2013 | Bhatia |
| 8,650,210 B1 | 2/2014 | Cheng et al. |
| 8,688,698 B1 | 4/2014 | Black et al. |
| 8,700,480 B1 | 4/2014 | Fox et al. |
| 8,825,474 B1 | 9/2014 | Zhai et al. |
| 8,938,669 B1 | 1/2015 | Cohen |
| 8,996,639 B1 | 3/2015 | Faaborg et al. |
| 9,191,786 B2 | 11/2015 | Davis |
| 9,213,941 B2 | 12/2015 | Petersen |
| 9,230,241 B1 | 1/2016 | Singh et al. |
| 9,262,517 B2 | 2/2016 | Feng et al. |
| 9,560,152 B1 | 1/2017 | Jamdar et al. |
| 9,674,120 B2 | 6/2017 | Davis |
| 9,715,496 B1 | 7/2017 | Sapoznik et al. |
| 9,805,371 B1 | 10/2017 | Sapoznik et al. |
| 9,807,037 B1 | 10/2017 | Sapoznik et al. |
| 9,817,813 B2 | 11/2017 | Faizakof et al. |
| 10,146,748 B1 | 12/2018 | Barndollar et al. |
| 2003/0105589 A1 | 6/2003 | Liu et al. |
| 2003/0182374 A1 | 9/2003 | Haldar |
| 2006/0029106 A1 | 2/2006 | Ott et al. |
| 2006/0156209 A1 | 7/2006 | Matsuura et al. |
| 2007/0030364 A1 | 2/2007 | Obrador et al. |
| 2007/0094217 A1 | 4/2007 | Ronnewinkel |
| 2007/0162942 A1 | 7/2007 | Hamynen et al. |
| 2007/0244980 A1 | 10/2007 | Baker et al. |
| 2008/0120371 A1 | 5/2008 | Gopal |
| 2009/0076795 A1 | 3/2009 | Bangalore et al. |
| 2009/0119584 A1 | 5/2009 | Herbst |
| 2009/0282114 A1 | 11/2009 | Feng et al. |
| 2010/0228590 A1 | 9/2010 | Muller et al. |
| 2010/0260426 A1 | 10/2010 | Huang et al. |
| 2011/0074685 A1 | 3/2011 | Causey et al. |
| 2011/0107223 A1 | 5/2011 | Tilton et al. |
| 2011/0164163 A1 | 7/2011 | Bilbrey et al. |
| 2011/0252108 A1 | 10/2011 | Morris et al. |
| 2012/0030289 A1 | 2/2012 | Buford et al. |
| 2012/0033876 A1 | 2/2012 | Momeyer et al. |
| 2012/0041941 A1 | 2/2012 | King et al. |
| 2012/0041973 A1 | 2/2012 | Kim et al. |
| 2012/0042036 A1 | 2/2012 | Lau et al. |
| 2012/0131520 A1 | 5/2012 | Tang et al. |
| 2012/0179717 A1 | 7/2012 | Kennedy et al. |
| 2012/0224743 A1 | 9/2012 | Rodriguez et al. |
| 2012/0245944 A1 | 9/2012 | Gruber et al. |
| 2013/0050507 A1 | 2/2013 | Syed et al. |
| 2013/0061148 A1 | 3/2013 | Das et al. |
| 2013/0073366 A1 | 3/2013 | Heath |
| 2013/0260727 A1 | 10/2013 | Knudson et al. |
| 2013/0262574 A1 | 10/2013 | Cohen |
| 2013/0346235 A1 | 12/2013 | Lam |
| 2014/0004889 A1 | 1/2014 | Davis |
| 2014/0035846 A1 | 2/2014 | Lee et al. |
| 2014/0047413 A1 | 2/2014 | Sheive et al. |
| 2014/0067371 A1 | 3/2014 | Liensberger |
| 2014/0088954 A1 | 3/2014 | Shirzadi et al. |
| 2014/0108562 A1 | 4/2014 | Panzer |
| 2014/0163954 A1 | 6/2014 | Joshi et al. |
| 2014/0164506 A1 | 6/2014 | Tesch et al. |
| 2014/0171133 A1 | 6/2014 | Stuttle et al. |
| 2014/0189027 A1 | 7/2014 | Zhang et al. |
| 2014/0189538 A1 | 7/2014 | Martens et al. |
| 2014/0201675 A1 | 7/2014 | Joo et al. |
| 2014/0228009 A1 | 8/2014 | Chen et al. |
| 2014/0237057 A1 | 8/2014 | Khodorenko |
| 2014/0317030 A1 | 10/2014 | Shen et al. |
| 2014/0337438 A1 | 11/2014 | Govande et al. |
| 2014/0372349 A1 | 12/2014 | Driscoll |
| 2015/0006143 A1 | 1/2015 | Skiba et al. |
| 2015/0032724 A1 | 1/2015 | Thirugnanasundaram et al. |
| 2015/0058720 A1 | 2/2015 | Smadja et al. |
| 2015/0095855 A1 | 4/2015 | Bai et al. |
| 2015/0100537 A1 | 4/2015 | Grives et al. |
| 2015/0171133 A1 | 6/2015 | Kim et al. |
| 2015/0178371 A1 | 6/2015 | Seth et al. |
| 2015/0178388 A1 | 6/2015 | Winnemoeller et al. |
| 2015/0207765 A1 | 7/2015 | Brantingham et al. |
| 2015/0227797 A1 | 8/2015 | Ko et al. |
| 2015/0248411 A1 | 9/2015 | Krinker et al. |
| 2015/0250936 A1 | 9/2015 | Thomas et al. |
| 2015/0286371 A1 | 10/2015 | Degani |
| 2015/0288633 A1 | 10/2015 | Ogundokun et al. |
| 2015/0302301 A1 | 10/2015 | Petersen |
| 2016/0037311 A1 | 2/2016 | Cho |
| 2016/0042252 A1 | 2/2016 | Sawhney et al. |
| 2016/0043974 A1 | 2/2016 | Purcell et al. |
| 2016/0072737 A1 | 3/2016 | Forster |
| 2016/0140447 A1 | 5/2016 | Cohen et al. |
| 2016/0140477 A1 | 5/2016 | Karanam et al. |
| 2016/0162791 A1 | 6/2016 | Petersen |
| 2016/0179816 A1 | 6/2016 | Glover |
| 2016/0210279 A1 | 7/2016 | Kim et al. |
| 2016/0224524 A1 | 8/2016 | Kay et al. |
| 2016/0226804 A1 | 8/2016 | Hampson et al. |
| 2016/0234553 A1 | 8/2016 | Hampson et al. |
| 2016/0283454 A1 | 9/2016 | Leydon et al. |
| 2016/0342895 A1 | 11/2016 | Gao et al. |
| 2016/0350304 A1 | 12/2016 | Aggarwal et al. |
| 2016/0378080 A1 | 12/2016 | Uppala et al. |
| 2017/0075878 A1* | 3/2017 | Jon ........................ G06F 17/276 |
| 2017/0093769 A1 | 3/2017 | Lind et al. |
| 2017/0098122 A1 | 4/2017 | el Kaliouby et al. |
| 2017/0134316 A1 | 5/2017 | Cohen et al. |
| 2017/0142046 A1 | 5/2017 | Mahmoud et al. |
| 2017/0149703 A1 | 5/2017 | Willett et al. |
| 2017/0153792 A1* | 6/2017 | Kapoor ............... G06F 3/04817 |
| 2017/0171117 A1 | 6/2017 | Carr et al. |
| 2017/0180276 A1 | 6/2017 | Gershony et al. |
| 2017/0180294 A1 | 6/2017 | Milligan et al. |
| 2017/0187654 A1 | 6/2017 | Lee |
| 2017/0250930 A1 | 8/2017 | Ben-Itzhak |
| 2017/0250935 A1 | 8/2017 | Rosenberg |
| 2017/0250936 A1 | 8/2017 | Rosenberg et al. |
| 2017/0293834 A1 | 10/2017 | Raison et al. |
| 2017/0308589 A1 | 10/2017 | Liu et al. |
| 2017/0324868 A1 | 11/2017 | Tamblyn et al. |
| 2017/0344224 A1* | 11/2017 | Kay ..................... G06F 3/04817 |
| 2017/0357442 A1 | 12/2017 | Peterson et al. |
| 2018/0004397 A1 | 1/2018 | Mazzocchi |
| 2018/0005272 A1 | 1/2018 | Todasco et al. |
| 2018/0012231 A1 | 1/2018 | Sapoznik et al. |
| 2018/0013699 A1 | 1/2018 | Sapoznik et al. |
| 2018/0060705 A1 | 3/2018 | Mahmoud et al. |
| 2018/0083894 A1 | 3/2018 | Fung et al. |
| 2018/0083898 A1 | 3/2018 | Pham |
| 2018/0083901 A1 | 3/2018 | McGregor et al. |
| 2018/0090135 A1 | 3/2018 | Schlesinger et al. |
| 2018/0109526 A1 | 4/2018 | Fung et al. |
| 2018/0137097 A1 | 5/2018 | Lim et al. |
| 2018/0196854 A1 | 7/2018 | Burks |
| 2018/0210874 A1 | 7/2018 | Fuxman et al. |
| 2018/0293601 A1 | 10/2018 | Glazier |
| 2018/0309706 A1 | 10/2018 | Kim et al. |
| 2018/0316637 A1 | 11/2018 | Desjardins |

(56) References Cited

U.S. PATENT DOCUMENTS

| | | |
|---|---|---|
| 2018/0322403 A1 | 11/2018 | Ron et al. |
| 2018/0336226 A1 | 11/2018 | Anorga et al. |
| 2018/0336415 A1 | 11/2018 | Anorga et al. |
| 2018/0367483 A1 | 12/2018 | Rodriguez et al. |
| 2018/0367484 A1 | 12/2018 | Rodriguez et al. |
| 2018/0373683 A1 | 12/2018 | Hullette et al. |

FOREIGN PATENT DOCUMENTS

| | | |
|---|---|---|
| CN | 102395966 | 3/2012 |
| CN | 102467574 | 5/2012 |
| CN | 103548025 | 1/2014 |
| EP | 1376392 | 1/2004 |
| EP | 1394713 | 3/2004 |
| EP | 2523436 | 11/2012 |
| EP | 2560104 | 2/2013 |
| EP | 2688014 | 1/2014 |
| EP | 2703980 | 3/2014 |
| EP | 3091445 | 11/2016 |
| KR | 20110003462 | 1/2011 |
| KR | 20130008036 | 1/2013 |
| KR | 20130061387 | 6/2013 |
| WO | 2004/104758 | 12/2004 |
| WO | 2011/002989 | 1/2011 |
| WO | 2016130788 | 8/2016 |
| WO | 2018089109 | 5/2018 |

OTHER PUBLICATIONS

USPTO, First Action Interview, Pre-Interview Communication for U.S. Appl. No. 16/003,661, dated Aug. 29, 2018, 6 pages.

Blippar, "Computer Vision API", www.web.blippar.com/computer-vision-api, 4 pages.

Chen, et al., "Bezel Copy: An Efficient Cross-0Application Copy-Paste Technique for Touchscreen Smartphones.", Advanced Visual Interfaces, ACM, New York, New York, May 27, 2014, pp. 185-192.

EPO, International Search Report and Written Opinion for International Patent Application No. PCT/US2016/068083, dated Mar. 9, 2017, 13 pages.

EPO, International Search Report for International Patent Application No. PCT/US2018/022501, dated May 14, 2018, 4 pages.

EPO, International Search Report for International Patent Application No. PCT/US2017/052349, dated Dec. 13, 2017, 5 pages.

EPO, International Search Report for International Patent Application No. PCT/US2017/057044, dated Jan. 18, 2018, 5 pages.

EPO, Written Opinion for International Patent Application No. PCT/US2017/057044, dated Jan. 18, 2018, 5 pages.

EPO, International Search Report for International Patent Application No. PCT/US2018/022503, dated Aug. 16, 2018, 6 pages.

EPO, Written Opinion for International Patent Application No. PCT/US2017/052349, dated Dec. 13, 2017, 6 pages.

EPO, Written Opinion for International Patent Application No. PCT/US2018/022501, dated May 14, 2018, 6 pages.

EPO, Written Opinion for International Patent Application No. PCT/US2018/022503, dated Aug. 16, 2018, 8 pages.

EPO, Written Opinion of the International Preliminary Examining Authority for International Patent Application No. PCT/US2017/052349, dated Aug. 6, 2018, 9 pages.

Fuxman, Ariel, ""Aw, so cute!": Allo helps you respond to shared photos", Google Research Blog, https://research.googleblog.com/2016/05/aw-so-cute-allo-helps-you-respond-to.html, May 18, 2016, 6 pages.

Kannan, et al., "Smart Reply: Automated Response Suggestions for Email", Proceedings of the 22nd ACM SIGKDD International Conference on Knowledge Discovery and Data Mining, KDD '16, ACM Press, New York, New York, Aug. 13, 2016, pp. 955-965.

Khandelwal, "Hey Allo! Meet Google's AI-powered Smart Messaging App", The Hacker News, http://web.archive.org/web/20160522155700/https://thehackernews.com/2016/05/google-allo-messenger.html, May 19, 2016, 3 pages.

Lee, Jang Ho, et al., "Supporting multi-user, multi-applet workspaces in CBE", Proceedings of the 1996 ACM conference on Computer supported cooperative work, ACM, Nov. 16, 1996, 10 pages.

Microsoft Corporation, "Windows Messenger for Windows XP", Retrieved from Internet: http://web.archive.org/web/20030606220012/messenger.msn.com/support/features.asp?client=0 on Sep. 22, 2005, Jun. 6, 2003, 3 pages.

PCT, "International Search Report and Written Opinion for International Application No. PCT/US2018/021028", dated Jun. 15, 2018, 11 Pages.

Pinterest, "Pinterest Lens", www.help.pinterest.com/en/articles|pinterest-lens, 2 pages.

Russell, "Google Allo is the Hangouts Killer We've Been Waiting for", Retrieved from the Internet: http://web.archive.org/web/20160519115534/https://www.technobuffalo.com/2016/05/18/google-allo-hangouts-replacement/, May 18, 2016, 3 pages.

USPTO, Notice of Allowance for U.S. Appl. No. 15/709,418, dated Mar. 1, 2018, 11 pages.

USPTO, Non-final Office Action for U.S. Appl. No. 15/709,418, dated Nov. 21, 2017, 15 pages.

USPTO, Notice of Allowance for U.S. Appl. No. 15/415,506, dated Jul. 23, 2018, 25 pages.

USPTO, First Action Interview, Pre-Interview Communication for U.S. Appl. No. 15/415,506, dated Apr. 5, 2018, 5 pages.

Vinyals, O. et al., "Show and Tell: A Neural Image Caption Generator", arXiv:1411.4555v2 [cs.CV], Apr. 20, 2015, pp. 1-9.

APO, Notice of Acceptance for Australian Patent Application No. 2015214298, dated Apr. 20, 2018, 3 pages.

APO, Examination Report No. 1 for Australian Patent Application No. 2015214298, dated Apr. 24, 2017, 3 pages.

APO, Examination Report No. 2 for Australian Patent Application No. 2015214298, dated Nov. 2, 2017, 3 pages.

USPTO, International Search Report and Written Opinion for International Patent Application No. PCT/US2015/014414, dated May 11, 2015, 8 pages.

EPO, Extended European Search Report for European Patent Application No. 15746410.8, dated Sep. 5, 2017, 7 pages.

EPO, Written Opinion of the International Preliminary Examination Authority for International Patent Application No. PCT/US2017/057044, dated Dec. 20, 2018, 8 pages.

USPTO, Notice of Allowance for U.S. Appl. No. 14/618,962, dated Nov. 8, 2016, 14 pages.

USPTO, Notice of Allowance for U.S. Appl. No. 15/428,821, dated Jan. 10, 2018, 20 pages.

USPTO, Non-final Office Action for U.S. Appl. No. 14/618,962, dated Feb. 26, 2016, 25 pages.

USPTO, Non-final Office Action for U.S. Appl. No. 15/428,821, dated May 18, 2017, 30 pages.

USPTO, Non-final Office Action for U.S. Appl. No. 15/946,342, dated Jul. 26, 2018, 40 pages.

Yeh, et al., "Searching the web with mobile images for location recognition", Proceedings of the 2004 IEEE Computer Society Conference on Pattern Recognition, vol. 2, Jun.-Jul. 2004, pp. 1-6.

USPTO, Notice of Allowance for U.S. Appl. No. 15/624,638, dated Feb. 28, 2019, 21 Pages.

EPO, International Search Report and Written Opinion for PCT Application No. PCT/US2017/046858, dated Oct. 11, 2017, 10 pages.

USPTO, First Action Interview, Office Action Summary for U.S. Appl. No. 15/624,637, dated Jan. 25, 2019, 5 pages.

USPTO, First Action Interview, Office Action Summary for U.S. Appl. No. 15/386,760, dated Jan. 30, 2019, 8 pages.

USPTO, Non-final Office Action for U.S. Appl. No. 15/238,304, dated Jun. 7, 2018, 17 pages.

USPTO, Final Office Action for U.S. Appl. No. 15/238,304, dated Nov. 23, 2018, 14 pages.

EPO, International Search Report for International Patent Application No. PCT/US2016/068083, dated Mar. 9, 2017, 4 pages.

EPO, Written Opinion of the International Preliminary Examining Authority for International Patent Application No. PCT/US2017/052713, dated Oct. 15, 2018, 6 pages.

EPO, Written Opinion for International Patent Application No. PCT/US2016/068083, dated Mar. 9, 2017, 9 pages.

(56) References Cited

OTHER PUBLICATIONS

International Bureau of WIPO, International Preliminary Report on Patentability for International Patent Application No. PCT/US2016/068083, dated Jul. 5, 2018, 9 pages.
KIPO, Preliminary Rejection for Korean Patent Application No. 10-2018-7013953, dated Oct. 29, 2018, 5 pages.
USPTO, Non-final Office Action for U.S. Appl. No. 15/386,162, dated Nov. 27, 2018, 12 pages.
USPTO, First Action Interview, Pre-Interview Communication for U.S. Appl. No. 15/624,637, dated Oct. 19, 2018, 4 pages.
USPTO, First Action Interview, Pre-Interview Communication for U.S. Appl. No. 15/386,760, dated Nov. 6, 2018, 5 pages.
USPTO, First Action Interview, Office Action Summary for U.S. Appl. No. 16/003,661, dated Dec. 14, 2018, 16 pages.
EPO, Communication Pursuant to Article 94(3) EPC for European Patent Application No. 16825663.4, Apr. 16, 2019, 5 pages.
EPO, Communication Pursuant to Article 94(3) EPC for European Patent Application No. 16825666.7, Apr. 23, 2019, 6 pages.
KIPO, Notice of Preliminary Rejection for Korean Patent Application No. 10-2019-7011687, dated May 7, 2019, 3 pages.
KIPO, Notice of Final Rejection for Korean Patent Application No. 10-2018-7013953, dated May 8, 2019, 4 pages.
USPTO, Notice of Allowance for U.S. Appl. No. 15/624,637, dated Apr. 19, 2019, 6 pages.
USPTO, Notice of Allowance for U.S. Appl. No. 15/238,304, dated Apr. 5, 2019, 7 pages.
USPTO, Notice of Allowance for U.S. Appl. No. 16/003,661, dated May 1, 2019, 11 pages.
USPTO, Non-final Office Action for U.S. Appl. No. 15/709,423, dated May 2, 2019, 21 Pages.
KIPO, Notice of Final Rejection for Korean Patent Application No. 10-2018-7013953, dated Jun. 13, 2019, 4 pages.
KIPO, Notice of Preliminary Rejection for Korean Patent Application No. 10-2018-7019756, dated May 13, 2019, 9 pages.
USPTO, Final Office Action for U.S. Appl. No. 15/386,162, dated Jun. 5, 2019, 13 pages.
USPTO, Final Office Action for U.S. Appl. No. 15/386,760, dated May 30, 2019, 13 pages.

\* cited by examiner

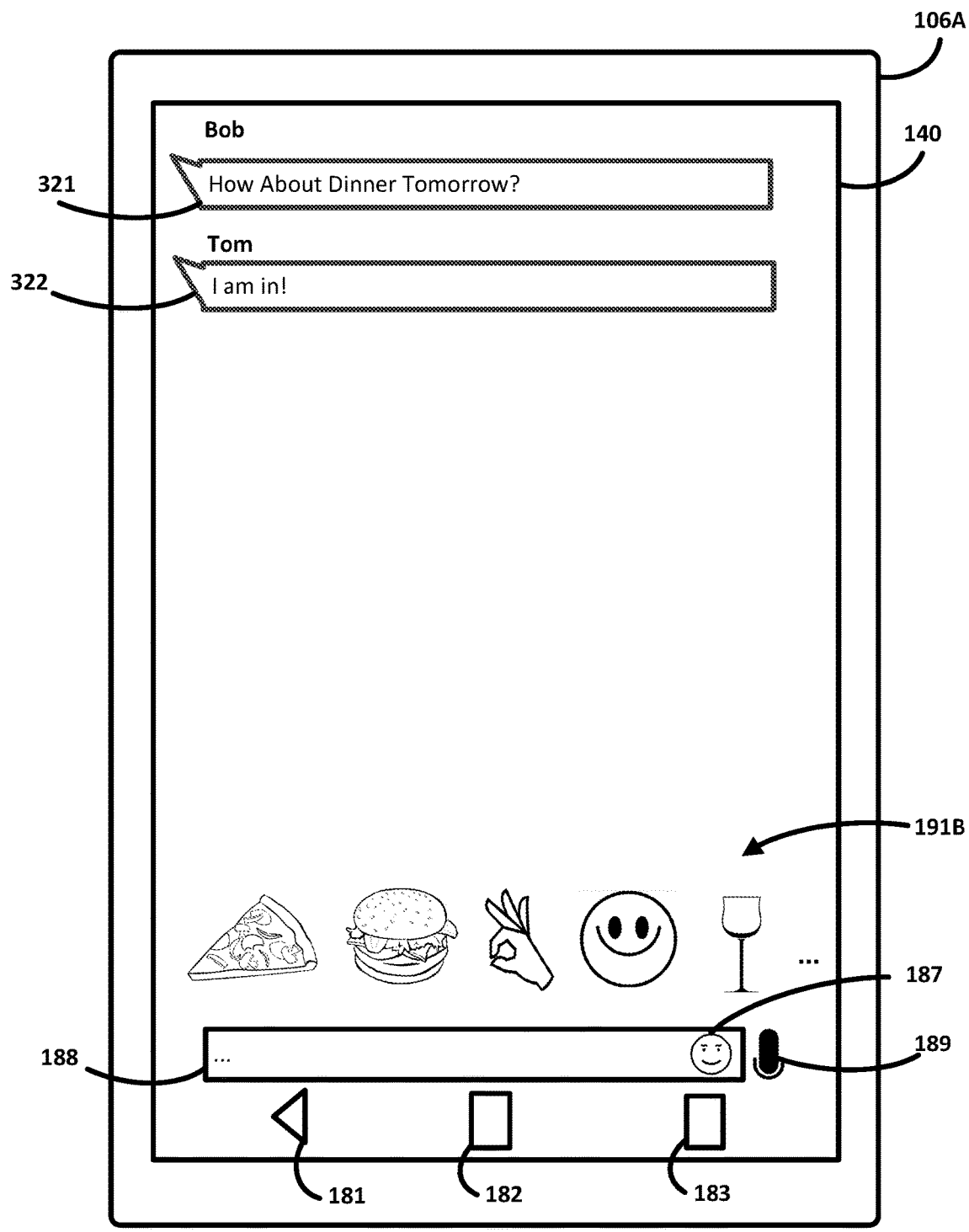
FIG. 3B1

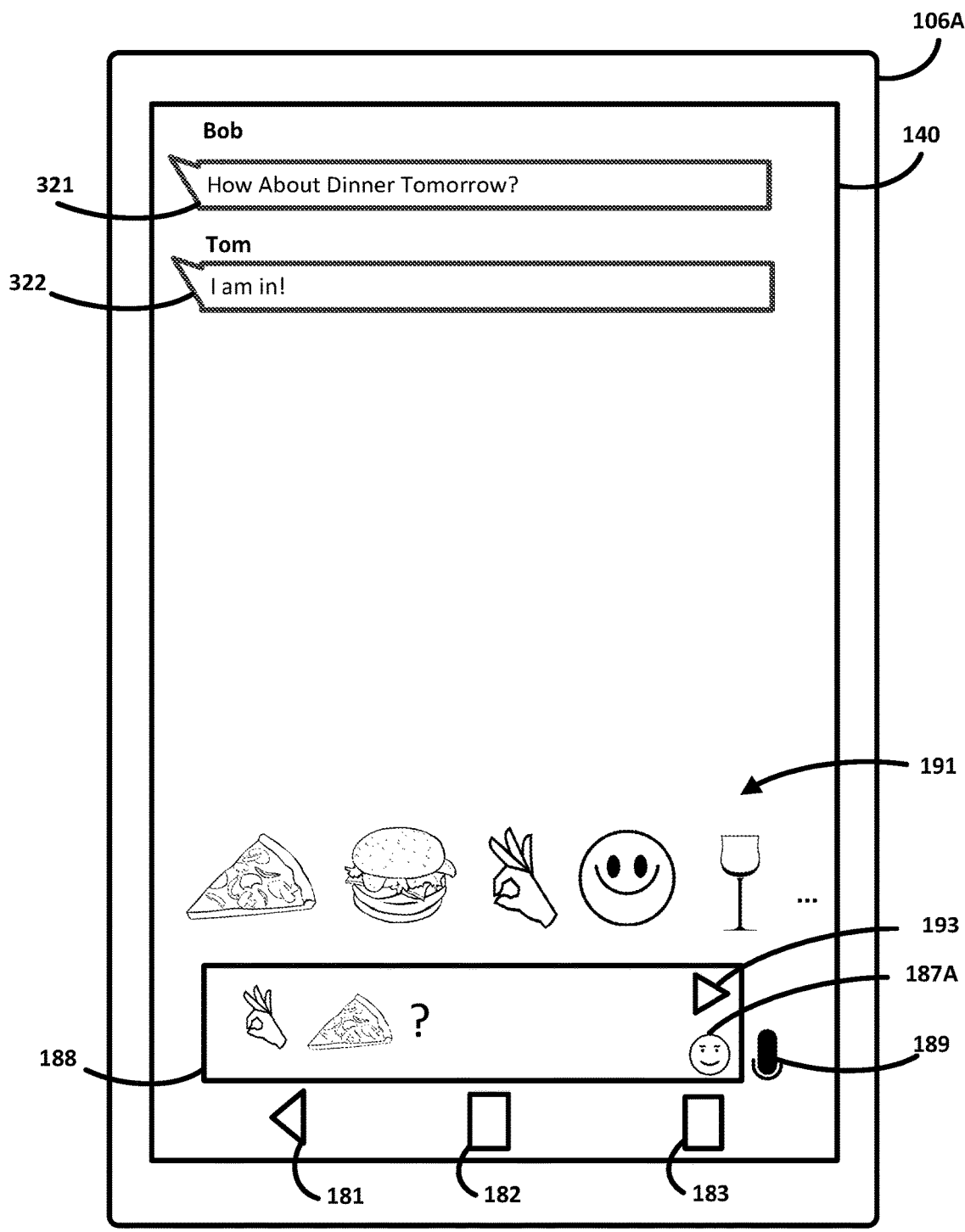
FIG. 3B2

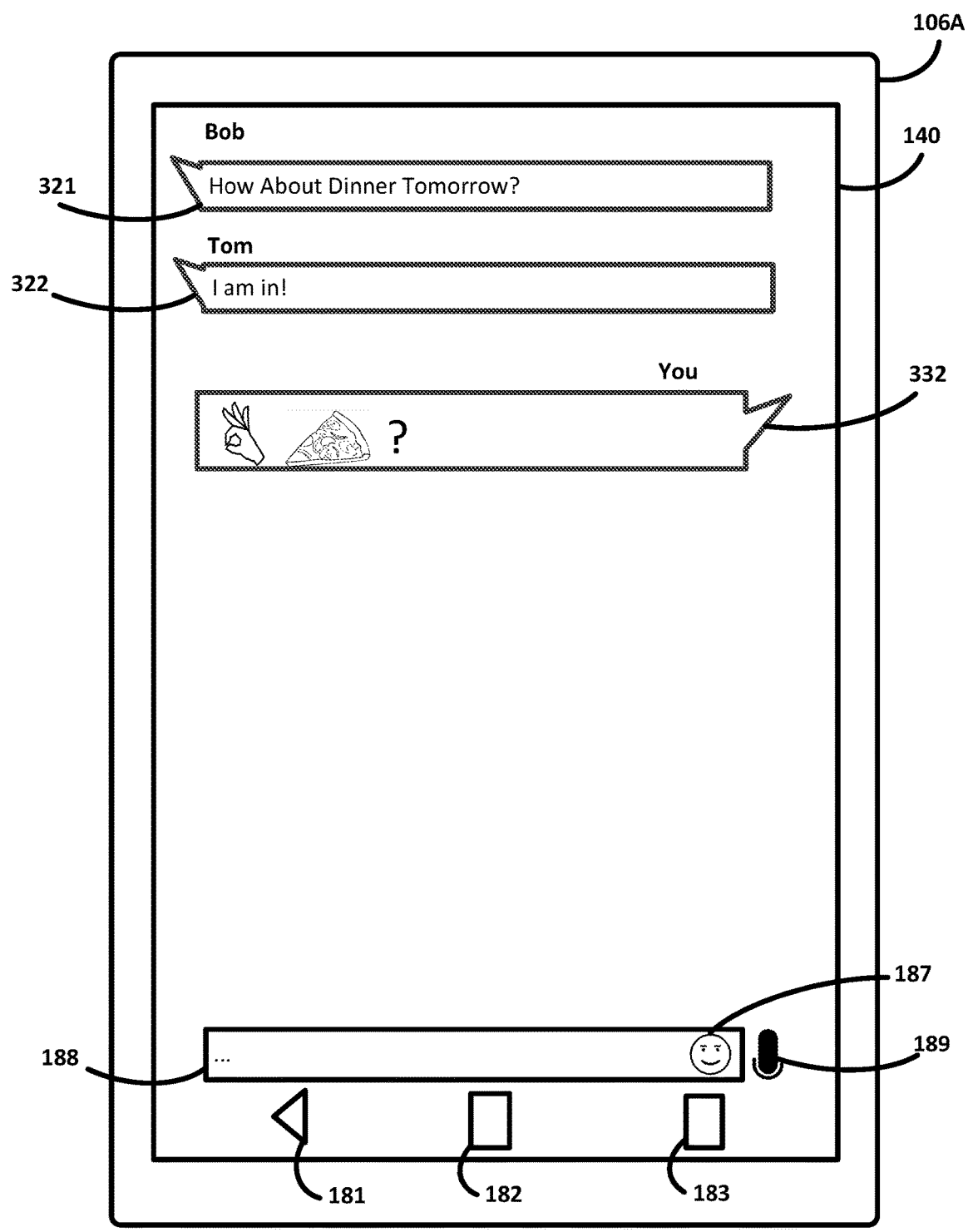
FIG. 3B3

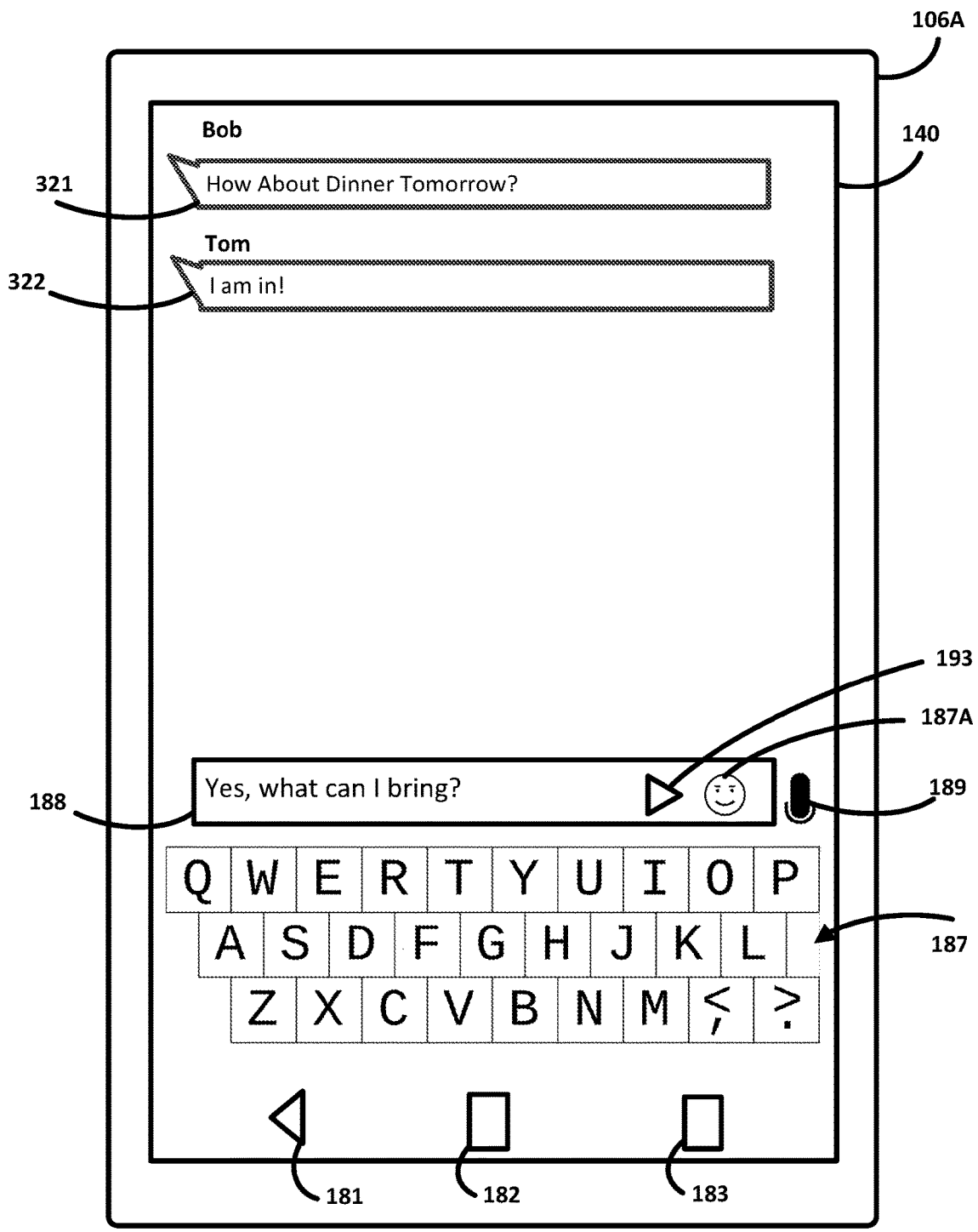
FIG. 3D1

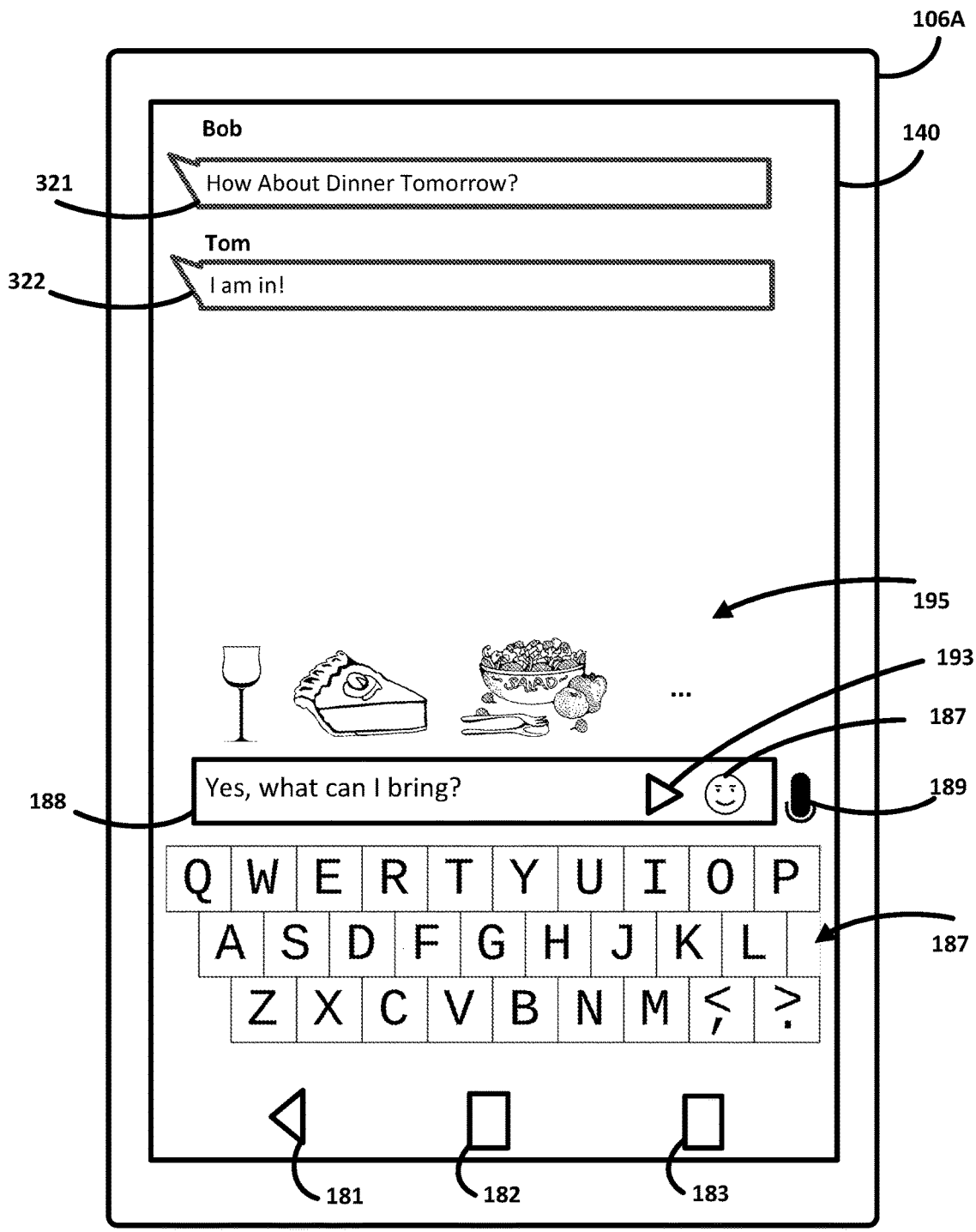
FIG. 3D2

DETERMINING GRAPHICAL ELEMENT(S) FOR INCLUSION IN AN ELECTRONIC COMMUNICATION

BACKGROUND

Individuals engage in electronic dialogs with one another utilizing a variety of electronic communications such as emails, rich communication services (RCS) messages, short message service (SMS) messages, multimedia messaging service (MMS) messages, over-the-top (OTT) chat messages, social networking messages, etc. Moreover, users engage in such dialogs utilizing a variety of computing devices, such as smart phones, tablet computers, wearable devices, automobile systems, and so forth. In many situations a user may include graphical elements in one or more electronic communications in addition to, or in lieu of, textual content. Graphical elements may take many forms such as emojis, Graphics Interchange Format images (GIFs), so-called stickers (which may be curated GIFs, JPGs, etc.), etc. Some graphical elements may themselves be completely void of any text when displayed (e.g., a smiley face emoji), while other graphical elements may include text when displayed (e.g., a GIF that includes graphical text in addition to other content).

SUMMARY

This specification is directed to methods, apparatus, and computer readable media related to determining graphical element(s) (e.g., emojis, GIFs, stickers) for inclusion in an electronic communication being formulated by a user via a computing device of the user, and providing the graphical element(s) for inclusion in the electronic communication. For example, the graphical element(s) may be provided for presentation to the user via a display of the computing device of the user and, in response to user interface input directed to one of the graphical element(s), that graphical element may be incorporated in the electronic communication. In various implementations, the electronic communication is a communication to be submitted as part of a dialog that involves the user and one or more additional users.

In some implementations, provided graphical element(s) are determined based at least in part on one or more features that are in addition to any input provided by the user in formulating the electronic communication for which the graphical elements are provided for inclusion. In some of those implementations, the graphical element(s) may be provided for inclusion in the electronic communication before the user has provided any textual content for inclusion in the electronic communication and/or before the user has provided any other content for inclusion in the electronic communication. In some implementations, the graphical element(s) may be provided in response to user interface input related to the electronic communication, such as the user selecting a "reply" interface element to initiate formulation of the electronic communication and/or selecting a "content suggestion" interface element.

In some implementations, the features that are in addition to any input provided by the user in formulating the electronic communication may include one or more of: submitted communication feature(s) of one or more previously submitted electronic communications of the dialog to which the electronic communication is to be submitted (e.g., prior dialog communication(s) of the user and/or of additional users); current state feature(s) that indicate current state(s), of one or more dynamic user states (e.g., location, sentiment), of one or more users engaged in the dialog; and/or historical usage of graphical elements by the user in the dialog, in other dialogs, and/or in other communications. In some implementations, the graphical elements may additionally or alternatively be determined based on subsequent communication features that are based on input provided by the user in formulating the electronic communication for which the graphical elements are to be provided for inclusion.

In some implementations, which graphical element(s) are provided for inclusion in an electronic communication of a dialog may be determined based on output generated over a trained machine learning model in response to applying one or more features (e.g., one or more of those described above) as input to the trained machine learning model. For example, submitted communication features of submitted electronic communications of a dialog and current state(s) of user(s) engaged in the dialog may be provided as input to the trained machine learning model. Output may be generated over the model based on the input, and the output may indicate one or more graphical element features of graphical elements. The output may be used to select one or more graphical elements to provide for potential inclusion in the electronic communication, based on those graphical elements having graphical element features that match the output.

In some implementations, a corpus of past electronic communications is analyzed to determine relationships between graphical elements and one or more features (e.g., one or more of those described above). For example, the corpus may be analyzed to determine, for a given graphical element, one more features of communications in which the given graphical element is included and/or one or more features of previously submitted communications in which the given graphical element is included in a reply to those previously submitted communications. In some implementations, a corpus of past electronic communications is analyzed to determine relationships between previously submitted communication(s) of dialogs and one or more subsequent communications of the dialogs. As one example, the corpus may be analyzed to determine that a dialog that includes submitted communication(s) that include the n-gram "dinner" are likely to include a subsequent communication that includes certain term(s) and/or graphical elements having certain graphical element features (e.g., graphical elements having an assigned "food" feature).

These relationships that are learned from analyzing the corpus of past electronic communications may be utilized to determine which graphical elements to provide for potential inclusion in an electronic communication being composed for submission in a dialog, as described herein. In some implementations, determining the relationships may be achieved via generating appropriate training examples based on a corpus of electronic communications and training a machine learning model based on those training examples to effectively embed the relationships in the trained machine learning model.

Some of the above mentioned and other implementations of the specification may achieve various technical advantages. For example, some implementations of determining and providing graphical elements to present to a user based on various features described herein may increase the likelihood that presented graphical elements are relevant to the user and/or to a current context of a dialog. This may mitigate the need for the user to navigate through and/or explicitly search a litany of irrelevant available graphical elements in an attempt to locate a relevant graphical element. This may reduce the use of various computational resources, such as resources of computing device(s) that are required for rendering and/or retrieving the irrelevant graphical elements. As another example, some implementations of determining and providing graphical elements to present to a user based on various features described herein may enable a more concise dialog to be achieved as a result of the presented graphical elements being selected by the user for inclusion in a communication of the dialog, and providing relevant additional context to the communication. This may obviate the need for certain further communications of the dialog that would otherwise be needed to provide the additional context, thereby reducing the use of various computational resources, such as resources of computing device(s), that are required for visually and/or audibly presenting the further communications to the user(s). Additional or alternative technical advantages may be achieved, such as one or more described elsewhere in this specification.

In some implementations, a method performed by one or more processors is provided that includes receiving an electronic communication submitted as part of a dialog that includes a user and one or more additional users. The electronic communication is based on user interface input generated by an additional user, of the additional users, via one or more user interface input devices of an additional user computing device of the additional user. The method further includes determining at least one communication feature of the electronic communication and determining a group of one or more graphical elements for inclusion in a subsequent electronic communication, of the user, to be submitted as part of the dialog. Determining the group of graphical elements includes, prior to any textual input provided by the user for the subsequent electronic communication: selecting, from candidate graphical elements, at least one graphical element to include in the group. Selecting the graphical element is based on the at least one communication feature of the electronic communication. The method further includes, prior to any textual input provided by the user for the subsequent electronic communication, providing the group of graphical elements for potential inclusion in the subsequent electronic communication. The group of graphical elements are provided for presentation via a display of a user computing device of the user.

These and other implementations of technology disclosed herein may optionally include one or more of the following features.

In some implementations, the method further includes identifying user interface interaction with a user interface element that is graphically presented to the user via the display in combination with a presentation of the electronic communication. In some of those implementations, providing the group of graphical elements is in response to identifying the user interface interaction with the user interface element.

In some implementations, the at least one communication feature is based on one or more of a plurality of terms of the electronic communication. In some versions of those implementations, the at least one communication feature further includes at least one non-textual feature that is based at least in part on one or more signals that are in addition to the terms of the electronic communication. In some other versions of those implementations, the method further includes determining at least one additional communication feature of an additional electronic communication of the dialog, and selecting the graphical element further based on the at least one additional communication feature.

In some implementations, the method further includes determining at least one current state feature that indicates a current state of at least one dynamic user state of the user or the additional user, and selecting the graphical element further based on the current state feature. In some of those implementations, the dynamic user state includes a physical location or a sentiment.

In some implementations, the method further includes identifying a historical usage feature for the graphical element, and selecting the graphical element further based on the historical usage feature. In some of those implementations, the historical usage feature is based at least in part on past usage by the user of additional graphical elements sharing one or more graphical element features with the graphical element.

In some implementations, selecting the graphical element based on the at least one communication feature includes: determining a graphical element feature based on the at least one communication feature, the graphical element feature being assigned to the graphical element and being assigned to a plurality of additional graphical elements; and selecting the graphical element to include in the group in lieu of one or more of the additional graphical elements based on the graphical element being associated with a greater degree of historical usage, by the user, than the non-selected one or more of the additional graphical elements. In some of those implementations, the graphical element is included in a cohesive pack of graphical elements and the historical usage of the graphical element is based on the historical usage, by the user, of the graphical elements of the cohesive pack.

In some implementations, selecting the graphical element based on the at least one communication feature includes: applying input to a trained machine learning model stored in one or more computer readable media, the input comprising the at least one communication feature; generating, over the model and based on the input, output that indicates one or more graphical element features; and selecting the graphical element based on the graphical element features being assigned to the graphical element. In some versions of those implementations, the output that indicates one or more graphical element features includes one or more terms and selecting the graphical element based on the graphical element features being assigned to the graphical element comprises selecting the graphical element based on it being indexed by at least one of the one or more terms. In some further versions of those implementations, the method further includes: generating the trained machine learning model based on a plurality of training examples derived from past user dialogs, where of the training examples includes: training example input based on communication features of a corresponding original electronic communication, and training example output based on text of a corresponding reply electronic communication that is a reply to the corresponding original electronic communication. Generating the trained machine learning model may include training the trained machine learning model based on application of the training example input of the training examples and back-propagation based on the training example output of the training examples. In some other versions of those implementations, the method further includes: generating the trained machine learning model based on a plurality of training examples derived from past user dialogs, where each of the training examples includes: training example input based on communication features of a corresponding original electronic communication, and training example output based on graphical element features of a corresponding reply electronic communication that is a reply to the corresponding original electronic communication. Generating the trained machine learning model may include training the trained machine learning model based on application of the training example input of the training examples and backpropagation based on the training example output of the training examples.

In some implementations, the communication feature includes one or more terms and selecting the graphical element based on the at least one communication feature includes selecting the graphical element based on it being indexed by at least one of the one or more terms.

In some implementations, the method further includes, after providing the group of graphical elements for potential inclusion in the subsequent electronic communication: receiving textual input provided by the user for the subsequent electronic communication, the textual input being based on user interface input generated by the user via one or more user interface input devices of the user computing device; determining a modified group of graphical elements based on the textual input and based on the at least one communication feature; and providing the modified group of graphical elements for potential inclusion in the subsequent electronic communication in combination with the textual input.

In some implementations, a method performed by one or more processors is provided that includes receiving an electronic communication submitted as part of a dialog that includes the user and one or more additional users. The electronic communication is based on user interface input generated by an additional user of the additional users via one or more user interface input devices of an additional user computing device of the additional user. The method further includes: determining at least one communication feature of the electronic communication; receiving textual input provided by the user for a subsequent electronic communication, of the user, to be submitted as part of the dialog; and determining a group of one or more graphical elements for inclusion in the subsequent electronic communication. Determining the group of graphical elements includes: selecting, from candidate graphical elements, at least one graphical element to include in the group, where selecting the graphical element is based on the textual input and is based on the at least one communication feature; and providing the group of graphical elements for potential inclusion in the subsequent electronic communication. The group of graphical elements are provided for presentation via a display of a user computing device of the user.

These and other implementations of technology disclosed herein may optionally include one or more of the following features.

In some implementations, providing the group of graphical elements is in response to receiving the textual input and occurs without further user interface input that explicitly requests provision of graphical elements.

In some implementations, the communication feature includes one or more terms and selecting the graphical element based on the at least one communication feature includes selecting the graphical element based on it being indexed by at least one of the one or more terms.

In some implementations, the method further includes determining at least one current state feature that indicates a current state of at least one dynamic user state of the user or the additional user, and selecting the graphical element further based on the current state feature.

In some implementations, a method performed by one or more processors is provided that includes receiving content provided by a user for inclusion in an electronic communication to be submitted by the user as part of a dialog. The content is based on user interface input generated by the user via one or more user interface input devices of a computing device of the user. The method further includes determining at least one feature of the content and determining a group of one or more graphical elements for inclusion in the electronic communication. Determining the group of graphical elements includes: selecting, from candidate graphical elements, at least one graphical element to include in the group, where selecting the graphical element is based on the feature of the content matching at least one graphical element feature assigned to the graphical element; and providing the group of graphical elements for potential inclusion in the electronic communication. The group of graphical elements are provided for presentation via a display of a user computing device of the user.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 3B1, 3B2, and 3B3 illustrate an example of how graphical elements may be presented to the user and included in a subsequent electronic communication that is submitted by the user as part of the dialog of FIG. 3A.

FIGS. 3D1 and 3D2 illustrate yet another example of how graphical elements may be presented to the user for potential inclusion in a subsequent communication to be submitted by the user as part of the dialog of FIG. 3A.

DETAILED DESCRIPTION

Figure 1:
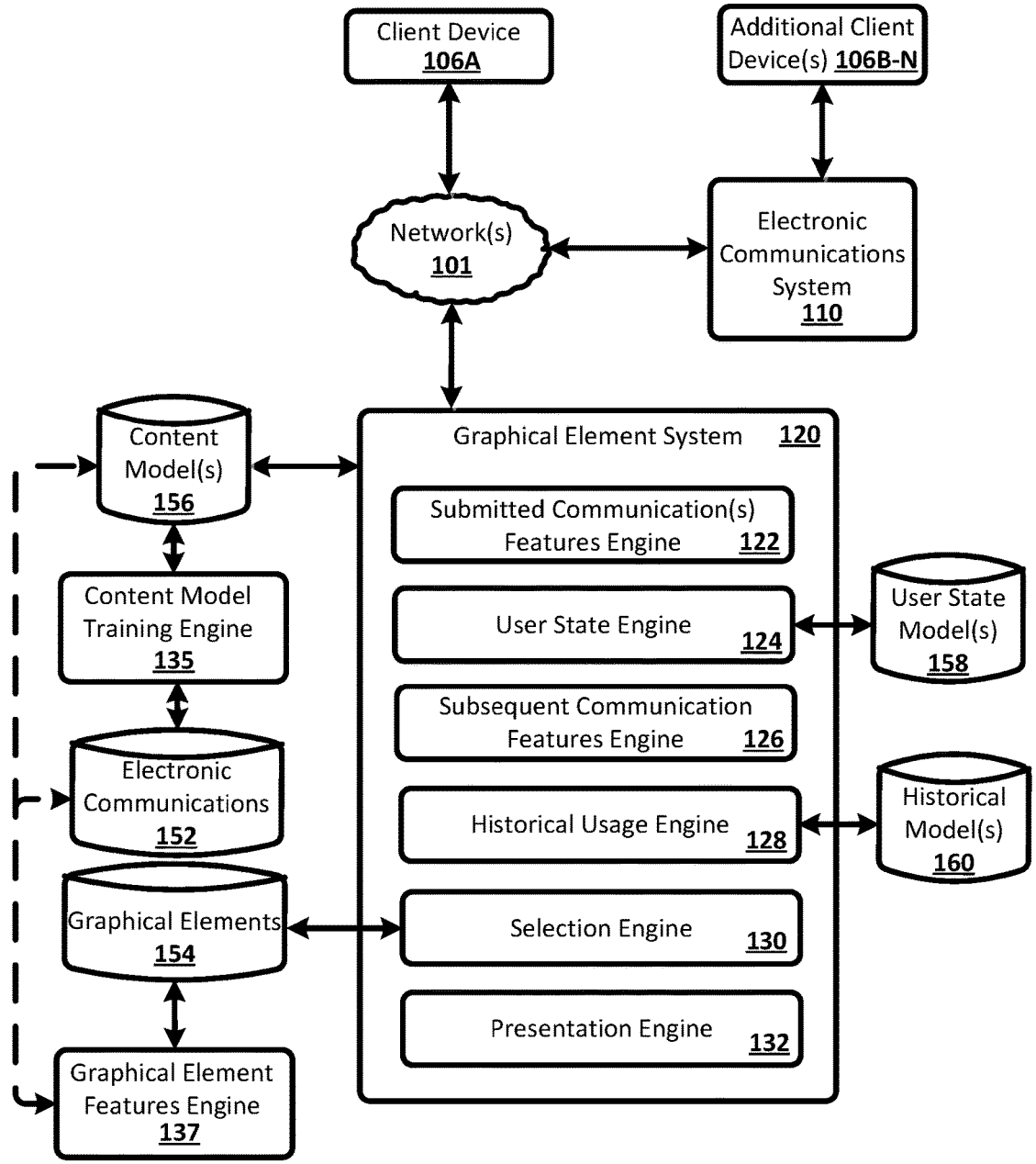
FIG. 1 is a block diagram of an example environment in which implementations disclosed herein may be implemented.

This specification is directed to technical features related to determining graphical element(s) for inclusion in an electronic communication being formulated by a user via a computing device of the user, and providing the graphical element(s) for inclusion in the electronic communication. For example, the graphical element(s) may be provided for presentation to the user via a display of the computing device and, in response to user interface input directed to one of the graphical element(s), that graphical element may be incorporated in the electronic communication.

In some implementations, provided graphical element(s) are determined based at least in part on one or more features that are in addition to any input provided by the user in formulating the electronic communication for which the graphical elements are provided for inclusion. In some of those implementations, the graphical element(s) may be provided for inclusion in the electronic communication before the user has provided any textual content and/or any other content for inclusion in the electronic communication. In some implementations, the graphical element(s) may be provided in response to user interface input related to the electronic communication.

In some implementations, the features that are in addition to any input provided by the user in formulating the electronic communication may include one or more of: submitted communication feature(s) of one or more previously submitted electronic communications of the dialog to which the electronic communication is to be submitted; current state feature(s) that indicate current state(s), of one or more dynamic user states, of one or more users engaged in the dialog; and/or historical usage of graphical elements by the user in the dialog, in other dialogs, and/or in other communications. In some implementations, the graphical elements may additionally or alternatively be determined based on subsequent communication features that are based on input provided by the user in formulating the electronic communication for which the graphical elements are to be provided for inclusion.

In some implementations, which graphical element(s) are provided for inclusion in an electronic communication of a dialog may be determined based on output generated over a trained machine learning model in response to applying one or more features (e.g., one or more of those described above) as input to the trained machine learning model. Output may be generated over the model based on the input, and the output may indicate one or more graphical element features of graphical elements. The output may be used to select one or more graphical elements to provide for potential inclusion in the electronic communication, based on those graphical elements having graphical element features that match the output.

In some implementations, a corpus of past electronic communications is analyzed to determine relationships between graphical elements and one or more features (e.g., one or more of those described above). In some implementations, a corpus of past electronic communications is analyzed to determine relationships between previously submitted communication(s) of dialogs and one or more subsequent communications of the dialogs.

These relationships that are learned from analyzing the corpus of past electronic communications may be utilized to determine which graphical elements to provide for potential inclusion in an electronic communication being composed for submission in a dialog, as described herein. In some implementations, determining the relationships may be achieved via generating appropriate training examples based on a corpus of electronic communications and training a machine learning model based on those training examples to effectively embed the relationships in the trained machine learning model.

Some of the above mentioned and other implementations of the specification may achieve various technical advantages. For example, some implementations of determining and providing graphical elements to present to a user based on various features described herein may increase the likelihood that presented graphical elements are relevant to the user and/or to a current context of a dialog. This may mitigate the need for the user to navigate through and/or explicitly search a litany of irrelevant available graphical elements in an attempt to locate a relevant graphical element. This may reduce the use of various computational resources, such as resources of computing device(s) that are required for rendering and/or retrieving the irrelevant graphical elements. As another example, some implementations of determining and providing graphical elements to present to a user based on various features described herein may enable a more concise dialog to be achieved as a result of the presented graphical elements being selected by the user for inclusion in a communication of the dialog, and providing relevant additional context to the communication. This may obviate the need for certain further communications of the dialog that would otherwise be needed to provide the additional context, thereby reducing the use of various computational resources, such as resources of computing device(s), that are required for visually and/or audibly presenting the further communications to the user(s). Additional or alternative technical advantages may be achieved, such as one or more described elsewhere in this specification.

In FIG. 1, an example environment in which techniques disclosed herein may be implemented is illustrated. The example environment includes a communication network 101 that optionally facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques.

The example environment also includes a client device 106A, additional client device(s) 106B-N, electronic communications system 110, graphical element system 120, content model training engine 135, and graphical element features engine 137. The example environment further includes an electronic communications database 152, a graphical elements database 154, a content model(s) database 156, a user state model(s) database 158, and a historical model(s) database 160.

Some non-limiting examples of client device(s) 106A-N include one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device). Additional and/or alternative client devices may be provided. In some implementations, a given user may communicate with all or aspects of graphical element system 120 utilizing a plurality of client devices that collectively form a coordinated "ecosystem" of client devices. However, for the sake of brevity, some examples described in this disclosure will focus on the user operating a single client device.

Electronic communications system 110, graphical element system 120, and/or engines 135 and/or 137 may each be implemented in one or more computing devices that communicate, for example, through a network (e.g., network 101 and/or other network). Electronic communications system 110, graphical element system 120, and engines 135 and 137 are example components via which the systems and techniques described herein may be implemented and/or with which systems and techniques described herein may interface. They may each include one or more memories for storage of data and software applications, one or more processors for accessing data and executing applications, and other components that facilitate communication over a network. In some implementations, electronic communications system 110, graphical element system 120, and/or engines 135 and/or 137 may include one or more components of the example computing device of FIG. 8. The operations performed by electronic communications system 110, graphical element system 120, and/or engines 135 and/or 137 may be distributed across multiple computer systems.

In some implementations, one or more aspects of one or more of electronic communications system 110, graphical element system 120, and/or engines 135 and/or 137 may be combined in a single system and/or one or more aspects may be implemented on the client device 106A and/or one or more of the additional client device(s) 106B-N. For example, the client device 106A may include an instance of one or more aspects of the graphical element system 120 and each of the additional client device(s) 106B-N may also include an instance of one or more aspects of the graphical element system 120. As another example, the client device 106A and each of the additional client device(s) 106B-N may each include an instance of the electronic communications system 110 (e.g., the electronic communications system 110 may be an application installed and executing on each of the devices). As yet another example, one or more aspects of electronic communications system 110 and graphical element system 120 may be combined.

The electronic communications database 152 includes one or more storage mediums that include all, or portions of (e.g., extracted features of), electronic communications of past dialogs of a plurality of users. In some implementations, the electronic communications database 152 is maintained by the electronic communications system 110. For example, the electronic communications system 110 may include one or more chat systems and the electronic communications database 152 may include a plurality of electronic communications that are sent and/or received via the system(s). As another example, the electronic communications system 110 may include one or more social networking systems and the electronic communications database 152 may include a plurality of messages, posts, or other electronic communications that are sent and/or received via the social networking system(s).

As used herein, an "electronic communication" or "communication" may refer to an email, a text message (e.g., RCS, SMS, MMS), a chat message, an instant message, or any other electronic communication that is sent from a user to a group of one or more additional users as part of a dialog. In various implementations, an electronic communication may include various metadata and the metadata may optionally be utilized in one or more techniques described herein. For example, an electronic communication such as chat message may include one or more sender identifiers, one or more recipient identifiers, a date sent, a type of device that sent and/or received the electronic communication, and so forth.

Graphical element system 120 determines and provides groups of graphical elements for potential inclusion in an electronic communication to be submitted by a user as part of a dialog. For convenience, many examples described herein will be described with respect to graphical element system 120 providing client device 106A with graphical elements for inclusion in an electronic communication, where the electronic communication is being composed by a user via the client device 106A to be submitted as part of a dialog that involves the user and additional users of additional client device(s) 106B-N. It is understood that graphical element system 120 (or other instances thereof) may also provide each of client device(s) 106B-N with graphical elements for inclusion in communications being composed via those client device(s) 106B-N

The graphical element system 120 may determine a group of graphical elements to provide for an electronic communication to be submitted by a user as part of a dialog, and may determine the group based on: one or more submitted communication features of previously submitted electronic communications of the dialog and/or one or more additional features, such as those described herein. In some implementations, the graphical element system 120 may determine and/or provide the group of graphical elements independent of any textual input provided by the user in generating the electronic communication to be submitted as part of the dialog and/or independent any other content provided by the user in generating the electronic communication to be submitted as part of the dialog.

In some implementations, the graphical elements determined and provided by graphical element system 120 include one or more emojis, GIFs, JPGs, and/or stickers. The graphical elements may be selected from graphical elements database 154, which is provided on one or more storage mediums. In some implementations, the graphical elements database 154 is provided locally on client device 106A. In some of those implementations, the graphical element system 120 is operated, in whole or in part, by one or more processors of the client device 106A. In some implementations, all or portions of the graphical elements database 154 and/or one or more aspects of the graphical element system 120 are additionally or alternatively provided remote from the client device 106A.

The graphical elements database 154 may define, for each of the graphical elements, associations of the graphical element to one or more graphical element features, and optionally weights for one or more of the associations. For example, each of the graphical elements may be indexed by one or more corresponding graphical element features and weights for each of the graphical element features. A weight of a given graphical element feature of a graphical element indicates how strongly the given graphical element feature is associated with the graphical element. For example, a given graphical element that depicts an alligator may be associated with a graphical element feature of "alligator" more strongly than it is associated with a graphical element feature of "animal".

Various graphical element features may be defined for a graphical element. As one example, graphical element features may include descriptors of content included in the graphical element. For instance, a graphical element that includes a depiction of an alligator may include descriptors such as a descriptor of "alligator", a descriptor of "animal". Also, for instance, non-textual descriptors may be provided such as a non-textual descriptor that identifies an entity associated with a graphical element. As another example, graphical element features may include features of electronic communications, of a corpus of past electronic communications, in which the graphical element was included in those electronic communications. For instance, a graphical element that includes a depiction of an alligator may include a textual feature of "later" that indicates it at least sometimes co-occurs in electronic communications with the n-gram "later." As another example, graphical element features may include features of electronic communications, of a corpus of past dialogs, in which those electronic communications preceded, in the dialogs, a subsequent electronic communication that includes the graphical element. For instance, a graphical element that includes a depiction of an alligator may include a feature that indicates a "departing remark" such as "talk to you soon", "bye", etc. that indicates the graphical element at least sometimes occurs in electronic communications that are subsequent to such "departing remark" electronic communications in dialogs. As yet another example, graphical element features may include features of user states associated with the graphical element. For instance, a graphical element that includes a depiction of an alligator may include a feature that indicates the graphical element at least sometimes occurs when user(s) of a dialog are located in Florida or Louisiana and/or when user(s) of a dialog have a "jovial" sentiment.

In some implementations, one or more graphical element features may be assigned to graphical elements by graphical element features engine 137. For example, the graphical element features engine 137 may assign features to a given graphical element based on analysis of past dialogs that include the graphical element and/or based on those features being assigned (directly or indirectly) to the graphical element in content model(s) of content model(s) database 156 (described in more detail below). In some implementations, one or more graphical element features of a graphical element may additionally or alternatively be assigned based on image analysis of the graphical element, may be assigned by human reviewers, and/or may be assigned utilizing other techniques.

The content mode(s) database 156 includes one or more storage mediums that store one or more content models optionally utilized in various techniques described herein. In some implementations, one or more of the content models define relationships between various dialog features described herein and features of graphical elements. For example, a content model may define relationships between communication features of electronic communications of a dialog and one or more features of graphical elements. In some implementations, one or more of the content models define relationships between various dialog features described herein and features of text. For example, a content model may define relationships between communication features of earlier submitted electronic communications of a dialog and one or more features of text included in later submitted communications of the dialog. Such a content model may be utilized, for example, to identify graphical elements that are indexed by, or otherwise associated with, graphical element features corresponding to those features of text.

In some implementations, the content models of database 156 include one or more learned content models that are each trained by content model training engine 135 based on training examples derived from past electronic communications of electronic communications database 152. For example, a content model of database 156 may be a trained machine learning model that has been trained to predict features of graphical elements based on various dialog features. For instance, it may be trained based on training examples that each include training example input that includes features of one or more earlier submitted communications of a corresponding dialog and training example output that includes feature(s) of graphical element(s) included in a later submitted communication of the corresponding dialog (e.g., a later submitted communication that is a direct reply to a corresponding one of the earlier submitted communications).

In various implementations, graphical element system 120 may include a submitted communication(s) features engine 122, a user state engine 124, a subsequent communication features engine 126, a historical usage engine 128, a selection engine 130, and/or a presentation engine 132. User state engine 124 may optionally be in communication with one or more user state models of user state models database 158. Historical usage engine 128 may optionally be in communication with one or more historical models of historical models database 160. In some implementations, all or aspects of engines 122, 124, 126, 128, 130, and/or 132 may be omitted. In some implementations, all or aspects of engines 122, 124, 126, 128, 130, and/or 132 may be combined. In some implementations, all or aspects of engines 122, 124, 126, 128, 130, and/or 132 may be implemented in a component that is separate from graphical element system 120, such as client device 106A and/or electronic communications system 110.

The submitted communication(s) features engine 122 determines one or more communication features of one or more communications that have already been submitted in a dialog. For example, the engine 122 may determine communication feature(s) for the most recently submitted communication in the dialog, for a threshold quantity of the most recently submitted communications in the dialog, and/or for any communications submitted in the dialog within a threshold amount of time relative to a current time.

The engine 122 may determine various communication features. For example, the engine 122 may determine one or more n-grams in the submitted electronic communication(s) as communication features. For instance, one or more of the n-grams may be determined based on term frequency of the n-gram in the submitted electronic communication(s) (i.e., how often the n-gram occurs in the electronic communication) and/or inverse document frequency of the n-gram in a collection of documents (i.e., how often the n-gram occurs in a collection of documents, such as a collection of electronic communications). Also, for example, the engine 122 may determine co-occurrence of two or more n-grams in one or more of the submitted electronic communication(s) as a communication feature, such as co-occurrence in a particular order (e.g., a first n-gram before a second n-gram), in a certain positional relationship (e.g., within n terms or characters of one another), etc. Also, for example, submitted communication(s) features engine 122 may determine one or more communication features based on one or more natural language processing tags or other labels applied to text of the submitted electronic communication(s) (e.g., parts of speech, named entities, entity types, tone); features based on text that occurs specifically in the first sentences, the last sentences, or other portion of the electronic communications; features based on metadata of the electronic communications such as a time the electronic communications were sent, day of the week the electronic communication were sent, a number of participants in the dialog, type(s) of device(s) that sent the electronic communication(s), etc. Also, for example, the engine 122 may determine one or more graphical element features of graphical elements included in one or more of the submitted electronic communication(s).

As another example of communication features, the engine 122 may determine predicted textual suggestion(s) that are contextually relevant to the submitted electronic communications (e.g., textual suggestions 194 of FIG. 3C) and utilize those textual suggestion(s) as communication feature(s). As yet another example of communication features, the engine 122 may determine an embedding vector of one or more features from the entirety of one or more submitted electronic communications or subset(s) of the submitted electronic communication(s) (e.g., one or more paragraphs, one or more sentences, one or more words). For instance, the engine 122 may apply or more features from a communication to a learned word embedding and determine, over the word embedding, an embedding vector of values mapped to the features in the word embedding. The embedding vector of values may be of a lower dimension than the applied features. The features utilized to determine the embedding vector may include one or more n-grams, labels applied to one or more n-grams, syntactic features, semantic features, metadata features, and/or other features.

The engine 122 provides determined communication features to selection engine 130 for utilization by selection engine 130 in determining graphical elements to provide for inclusion in a subsequent communication to be submitted as part of the dialog.

The subsequent communication features engine 126 determines one or more subsequent communication features (if any) of the subsequent communication. For example, where the user has provided content to be included in the subsequent communication (e.g., textual input, graphical element(s)), the engine 126 may determine features of that content. Various features may be determined, such as one or more of those described above with respect to the engine 122. The engine 126 provides determined subsequent communication features to selection engine 130 for utilization by selection engine 130 in determining graphical elements to provide for inclusion in a subsequent communication to be submitted as part of the dialog.

The user state engine 124 determines one or more current states of one or more dynamic states of one or more users engaged in the dialog. The user state engine 124 may determine the current state(s) of user(s) after appropriate authorization is obtained from those user(s). In some implementations, a current state may indicate a location of one or more users engaged in the dialog. For example, a current state may indicate a current location of the user that is formulating the subsequent communication to be submitted as part of the dialog. The location may be defined at various levels of granularity such as a city, state, ZIP code, a class of location (e.g., home, restaurant, Italian restaurant, concert venue). As another example, a current state may indicate the current location(s) of one or more additional users in the dialog, such as the user that most recently submitted a communication in the dialog.

In some implementations, a current state may indicate one or more classes and/or magnitudes of sentiment for one or more users engaged in the dialog. Various classes and/or magnitudes may be utilized. For example, classes that are indicative of happy, sad, neutral, active, tired, stressed, and/or other user state(s) may be utilized. In some of those and/or other implementations, the user state engine 124 may also determine a magnitude of one or more of the sentiments. For instance, the user state engine 124 may determine a weight of "0.8" for "happy", a weight of "0.7" for "active", and a weight of "0.0" for the other classes. Also, for example, more granular classes may additionally and/or alternatively be utilized such as slightly happy, medium happy, and very happy (e.g., in lieu of a general "happy" class).

In some implementations, the user state engine 124 may utilize content of communications of the dialog in determining sentiment for one or more users. For example, the user state model(s) database 158 may include a sentiment classifier model and the engine 124 may apply, as input to the model, textual content from one or more communications of the dialog and generate, over the model based on the input, an indication of a sentiment indicated by the textual content. As another example, graphical elements included in submitted communications of a dialog may be mapped to graphical element features that indicate sentiment associated with those graphical elements. The user state engine 124 may utilize such mappings in determining sentiment.

In some implementations, the user state engine 124 determines sentiment for one or more users using one or more indicators that are in addition to content of communications of the dialog, such as indicators based on one or more sensors (e.g., camera, microphone, keyboard sensors, touchscreen sensors, heart rate sensor) of a computing device (e.g., one of client devices 106A-N) of at least one of the users participating in the dialog. In some of those implementations, the user state engine 124 determines class(es) and/or magnitude(s) of sentiment based on applying one or more user state indicators to one or more trained classifier model(s) or other trained machine learning model(s) of user state models database 158. For example, one or more images of a user captured by a camera may be passed through a face detector and further through a facial expression classifier whose output indicates whether the facial expression is happy, tired, sad, and/or other class. The user state engine 124 may determine the sentiment based at least in part on the output of the facial expression classifier. As another example, a typing speed of a user determined from sensor data associated with one of the user interface input devices of a client device of the user may be applied by the user state engine 124 to a user state model of database 158 and generated output utilized to determine sentiment of the user.

In some implementations, the user state engine 124 determines sentiment based on synthesizing multiple indicators. For example, the user state engine 124 may apply an image of a user captured by a camera to a first classifier trained to predict class(es) of sentiment based on images and may apply heart rate sensor data to a second classifier trained to predict class(es) of sentiment based on heart rate sensor data. The user state engine 124 may consider the outputs of the two classifiers in determining the sentiment. For example, the user state engine 124 may average the outputs to determine the sentiment, use the greater magnitude output in determining the sentiment, and/or otherwise consider and/or combine both outputs in determining the sentiment.

In some implementations, the user state engine 124 determines current state features(s) indicative of current states of multiple users involved in a dialog. The user state engine 124 may determine current state feature(s) indicative of the current states of multiple users utilizing various techniques. For example, the user state engine 124 may determine one or more classes and/or magnitudes of sentiment for a first user, determine one or more classes and/or magnitudes of sentiment for a second user, and determine a combined sentiment based on the classes and/or magnitudes for both users. For example, the user state engine 124 may average the classes and magnitudes of the two users. Additional or alternative techniques of determining current state feature(s) that is indicative of the user states of multiple users may be utilized.

In some implementations, the user state engine 124 may determine current state feature(s) based on sensor data from one or more user interface input device(s) used by users engaged in the dialog. For example, when a given user has provided typed input in a dialog (e.g., using a physical keyboard or virtual keyboard), the sentiment of the given user may be determined based on a typing speed of the typed input, applied pressure for one or more characters of typed input (e.g., as sensed by a touch screen implementing a virtual keyboard), a "delay time" for starting to provide the typed input (e.g., when the typed input is provided responsive to other content), and/or other sensed features of the typed input. As another example, when the given user has provided voice input in a dialog (e.g., as sensed by a microphone), the sentiment of the given user may be determined based on tone, inflection, intonation, accent, pitch, volume, breathing volume, breathing rate, background noise level, background noise type, and/or other features of the voice input. As another example, the user state engine 124 may determine sentiment for the given user based on audio input from a microphone, even when the microphone isn't used by the given user to provide textual input. For example, the user state engine 124 may determine the sentiment based on the presence and/or absence of certain types of sound (e.g., laughter, crying, music) in the audio input, background noise level in the audio input, breathing noise level in the audio input, breathing rate in the audio input, aspects of detected speech in the audio input (e.g., intonation, accent), etc.

The user state engine 124 provides determined current state feature(s) to selection engine 130 for utilization by selection engine 130 in determining graphical elements to provide for inclusion in a subsequent communication to be submitted as part of the dialog.

The historical usage engine 128 stores, in historical models database 160, historical usage features related to past usage of graphical elements by the user composing the communication to be submitted as part of the dialog. Various types of historical usage features may be stored. For example, the historical usage engine 128 may store a quantity and/or frequency of: usage of each of a plurality of individual graphical elements (e.g., frequency of usage of a particular emoji); usage of graphical elements having particular graphical features (e.g., frequency of usage of graphical elements having a "happy" graphical element feature); usage of graphical elements from a particular cohesive pack (e.g., frequency of usage of graphical elements from a "custom" sticker pack installed by the user). Moreover, historical usage features may optionally be associated with context information that indicates context of the historical usage, such as users(s) engaged in the dialog(s) associated with the usage; locations, dates, and/or times associated with the usage; etc. For example, historical usage features may indicate a frequency of usage of graphical elements having a particular graphical feature in combination with dialog(s) involving a group of one or more other users.

The historical usage engine 128 provides historical usage features to selection engine 130 for utilization by selection engine 130 in determining graphical elements to provide for inclusion in a subsequent communication to be submitted as part of the dialog.

The selection engine 130 utilizes one or more of the features provided by the engines 122, 124, 126, and/or 128 to determine a group of graphical elements to provide for inclusion in subsequent communication to be submitted as part of the dialog. In some implementations, the selection engine 130 utilizes features from each of the engines 122, 124, 126, and 128. In some other implementations, features may only be provided by a subset of the engines 122, 124, 126, and 128 (e.g., one or more engines may be omitted) and/or the selection engine 130 may only utilize a subset of provided features.

In some implementations, the selection engine 130 selects one or more graphical elements for inclusion in the group based on provided features matching one or more graphical element features that are assigned to those graphical elements in graphical elements database 154. In some of those implementations, the selection engine 130 may further select the graphical elements for inclusion based on weights of the matching graphical element features for the selected graphical elements. As one example, assume submitted communication features engine 122 provides a communication feature that is an n-gram "dinner" and that user state engine 124 provides a current state feature that indicates a current state of "jovial". The selection engine 130 may select one or more graphical elements that have graphical element features that include an n-gram of "dinner" and a current state of "jovial", and may optionally select them based on the weights of "dinner" and "jovial" for those graphical elements. As another example, assume submitted communication features engine 122 provides a predicted textual suggestion of "later alligator" that is contextually relevant to a submitted electronic communication (e.g., a submitted electronic communication of "bye"). The selection engine 130 may select a graphical element that is indexed by one or more terms of the predicted textual suggestion, such as a graphical element that depicts an alligator and is indexed by the term "alligator".

In some implementations, the selection engine 130 may apply one or more provided features as input to one or more of the content models of content models database 156, and select one or more graphical elements from database 154 based on output generated over the content model(s) based on the applied input. For example, one of the content models may define relationships between submitted communication features of a dialog and one or more features of graphical elements. The selection engine 130 may apply, as input to the content model, submitted communication features provided by engine 122 and generate, over the content model based on the input, an indication of one or more graphical element features. The selection engine 130 may utilize the generated indication to select one or more graphical elements to include in the group. As another example, one of the content models may define relationships between communication features of earlier submitted electronic communications of a dialog and one or more features of text included in later submitted communications of the dialog. The selection engine 130 may apply, as input to the model, various received dialog features and generate, over the model based on the input, an indication of features of text that is typically submitted in later communications of the dialog. The selection engine 130 may utilize the features of the text to select one or more graphical elements to include in the group based on those graphical elements having graphical element features that match the features of text.

The presentation engine 132 provides the group of graphical elements determined by the selection engine 130 for inclusion in an electronic communication to be submitted as part of the dialog. Providing a group of graphical elements may include, for example, providing the actual graphical elements or providing indications of the graphical elements. In some implementations, the presentation engine 132 may provide the group of graphical elements for presentation and, when a user generating the communication selects one of the graphical elements, the corresponding graphical element may be incorporated in the communication. In some implementations, the group of graphical elements may be provided and/or presented in response to the user selecting a "reply" user interface element, an "additional content" user interface element, or in response to other user interface input indicative of a desire to include graphical elements in the communication.

In some implementations, the presentation engine 132 provides the graphical elements for presentation independent of any textual input and/or other content provided via a computing device of the user in generating the communication. In some implementations, the presentation engine 132 provides the graphical elements for inclusion in the reply based on scores for the graphical elements that are determined by the selection engine 130. For example, in some implementations the presentation engine 132 may provide the graphical elements for presentation with prominences that are based on their associated scores. For example, the graphical element with the score most indicative of relevance may be provided for presentation most prominently (e.g., the topmost, leftmost, and/or largest). As another example, when the scores for one or more of the selected graphical elements of a group satisfy a threshold, the group of graphical elements may be provided for presentation automatically or in response to certain first user interface input, whereas separate user interface input may be required when the score(s) fail to satisfy the threshold. For example, if the scores satisfy the threshold, the group of graphical elements may be provided and presented to the user when the user selects a "reply" interface element without requiring the user to separately select an "additional content" interface element that explicitly solicits suggested graphical elements and/or other additional content. However, if the score doesn't satisfy the threshold, the group of graphical elements may not be provided and presented to the user when the user selects a reply interface element. Rather, selection of the separate "additional content" interface element may be required before providing and/or presenting the group of graphical elements to the user.

In some implementations, one or more (e.g., all) aspects of the presentation engine 132 may be implemented by the client device 106A and/or the electronic communications system 110. In some implementations, the presentation engine 132 provides only indications of graphical elements of a group, and potentially prominence information, and the client device 106A and/or electronic communications system 110 may generate a display of the group of graphical elements based on the provided data. In some implementations, the presentation engine 132 may additionally provide some or all of the data necessary to generate the display. In some of those implementations, any provided prominence information may be incorporated in the data that indicates how the display should be presented.

Figure 2:
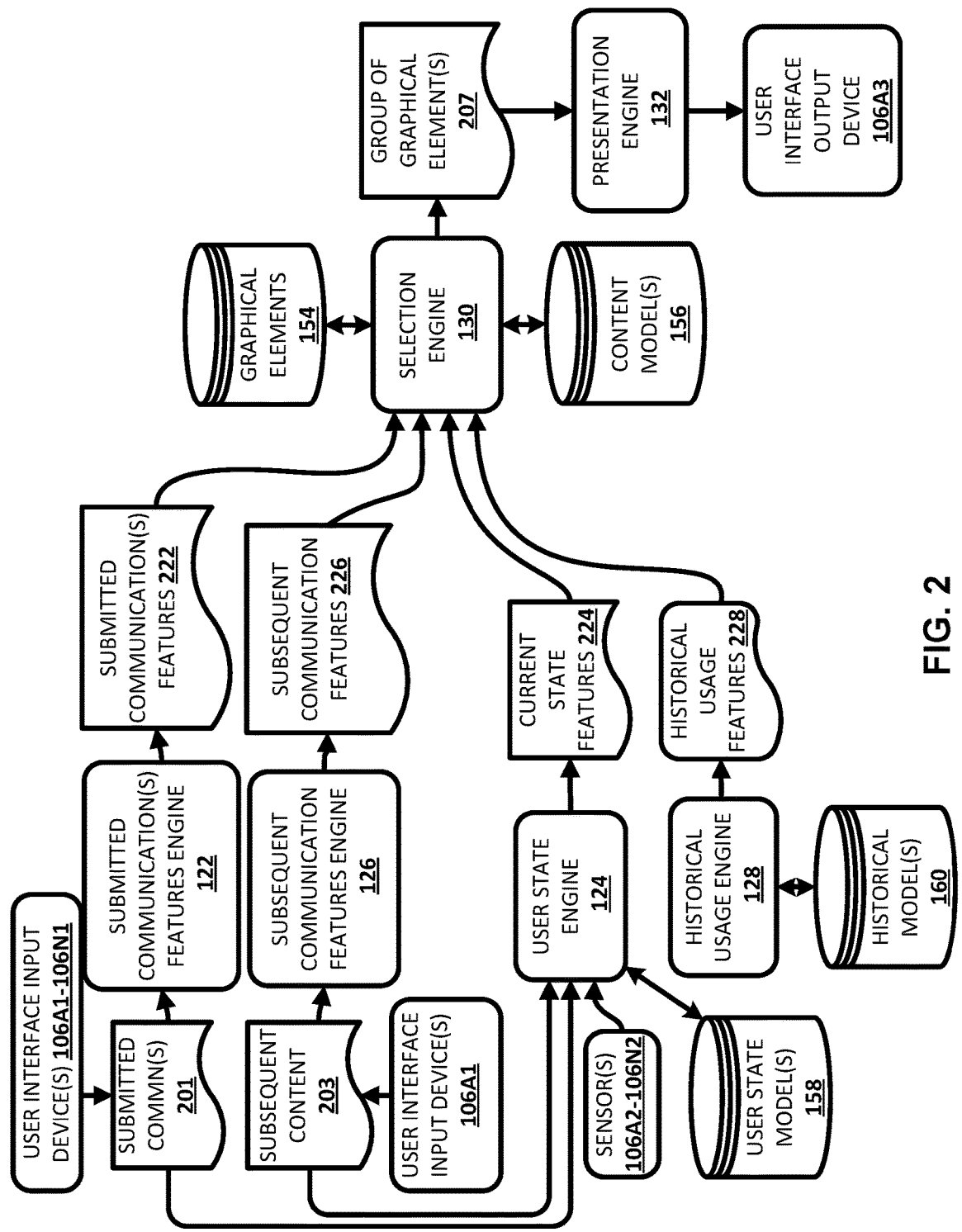
FIG. 2 illustrates an example of using components of the example environment of FIG. 1 in selecting graphical elements for providing to a user.

Referring now to FIG. 2, additional description is provided of the components of FIG. 1. In FIG. 2, user interface input devices 106A1-106N1 of corresponding client devices 106A-106N are utilized in generating submitted communications 201 that have been submitted as part of a dialog. For example, a user of client device 106B may utilize user interface input device 106B1 to submit one of the submitted communications 201 as part of a dialog that involves the user of the client device 106B, the user of the client device 106A, and optionally one or more additional users.

The submitted communication(s) features engine 122 determines one or more submitted communication features 222 of the submitted communications 201 and provides the submitted communication features 222 to the selection engine 130.

The user of the client device 106A optionally utilizes user interface input device(s) 106A1 in providing subsequent content 203 for inclusion in a subsequent electronic communication to be submitted by the user as part of the dialog. For example, the content may include text based on spoken or typed input of the user. The subsequent communication features engine 126 determines one or more subsequent communication features 226 based on the subsequent content 203 and provides the subsequent communication features 226 to the selection engine 130. As described herein, in some implementations the user may not have provided any subsequent content 203 for inclusion in the subsequent electronic communication and subsequent communication features 226 may not be determined or provided to the selection engine 130.

The user state engine 124 determines current state features 224 for one or more users engaged in the dialog based on content of the submitted communications 201, based on the subsequent content 203, and/or based one or more sensors 106A2-106N2 of corresponding client devices 106A-106N. The user state engine 124 may optionally utilize one or more user state models of database 158 in determining the current state features 224 based on such input. The user state engine 124 provides the current state features 224 to the selection engine 130.

The historical usage engine 128 provides historical usage features 228 to the selection engine 130 based on one or more historical models of historical model(s) database 160.

The selection engine 130 determines a group of graphical elements 207 based on one or more of the provided features 222, 224, 226, and 228. In some implementations, the selection engine 130 selects one or more of the graphical elements of the group 207 based on those graphical elements each having assigned graphical element features, in the graphical elements database 154, that match one or more of the provided features 222, 224, 226, and 228. In some implementations, the selection engine 130 additionally or alternatively selects one or more of the graphical elements of the group 207 based on applying one or more of the provided features 222, 224, 226, and 228 as input to one or more of the content models of content model(s) database 156, generating output over the content model(s) based on the input, and selecting graphical elements having assigned graphical element features, in the graphical elements database 154, that match the generated output.

The presentation engine 132 provides the group of graphical elements 207 for presentation to the user via a user interface output device 106A3 (e.g., a display) of the client device 106A.

Although FIG. 2 is illustrated with each of the engines 122, 124, 126, and 128 providing feature to the selection engine 130, in other implementations one or more of the engines may not provide features to the selection engine 130 (e.g., one or more engines may be omitted).

Figure 3A:
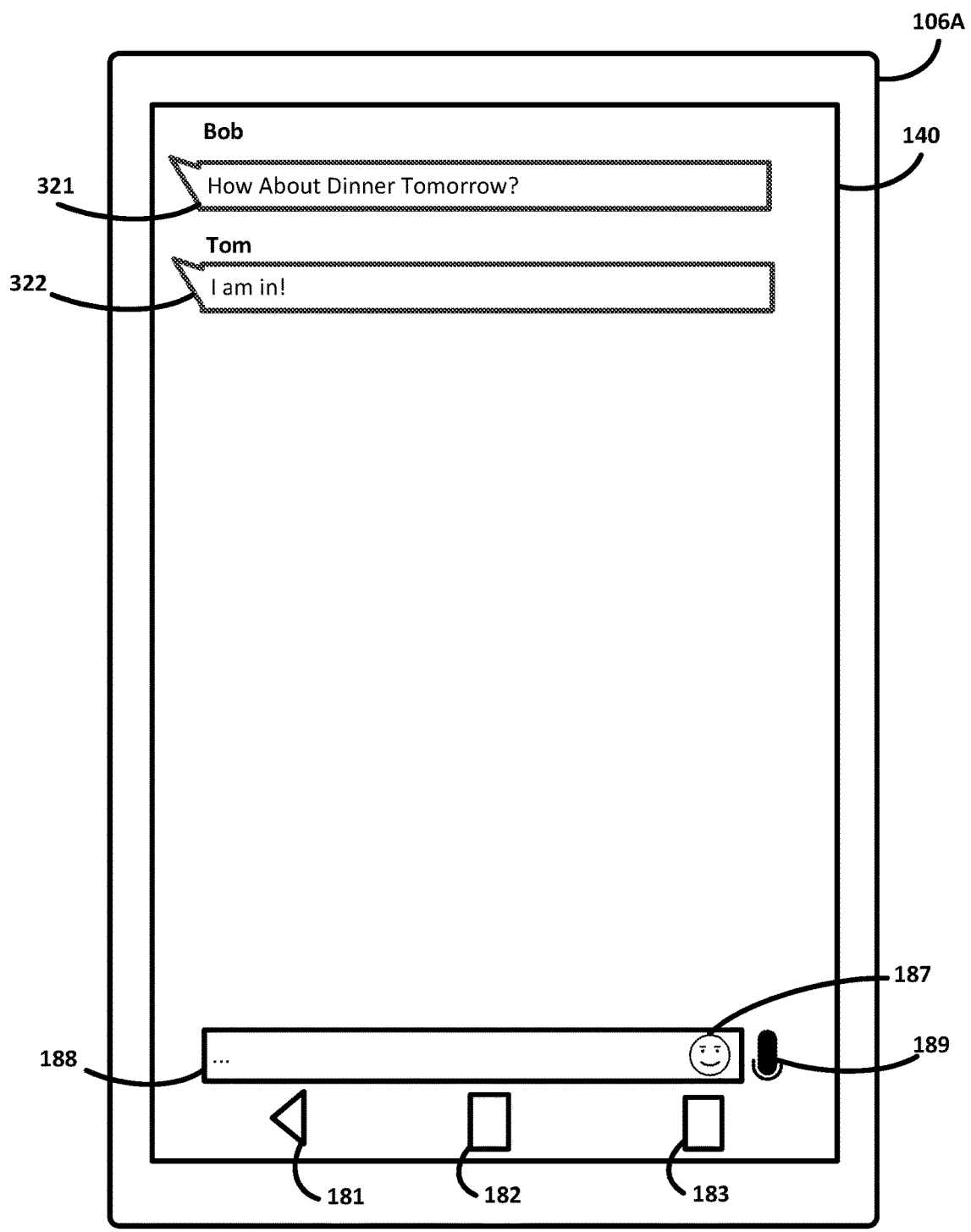
FIG. 3A illustrates an example client computing device with a display screen displaying an example of dialog that includes a user of the client computing device and a plurality of additional users; the dialog includes a submitted electronic communication from each of two of the additional users.
Figure 3C:
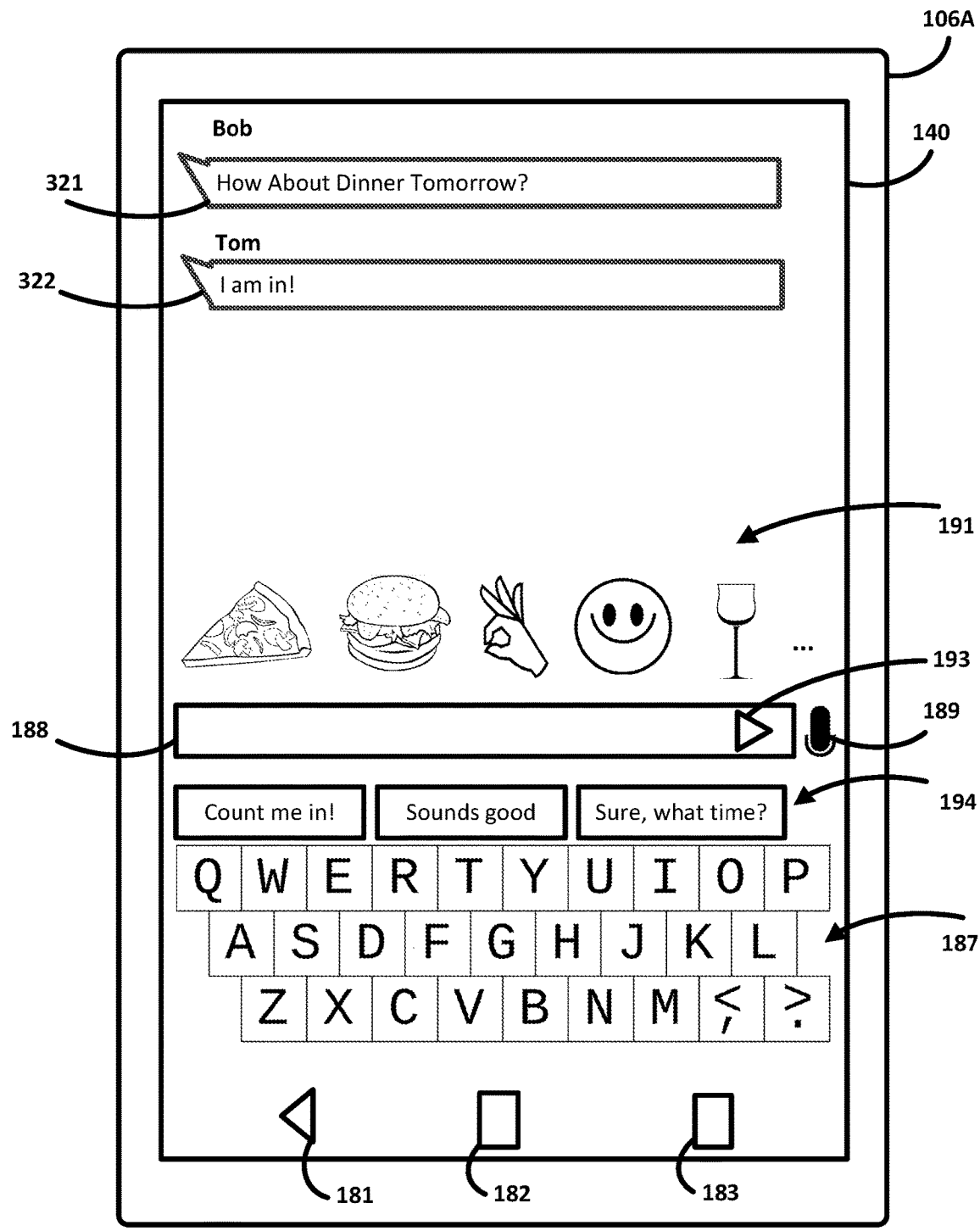
FIG. 3C illustrates another example of how graphical elements may be presented to the user for potential inclusion in a subsequent communication to be submitted by the user as part of the dialog of FIG. 3A.
Figure 4:
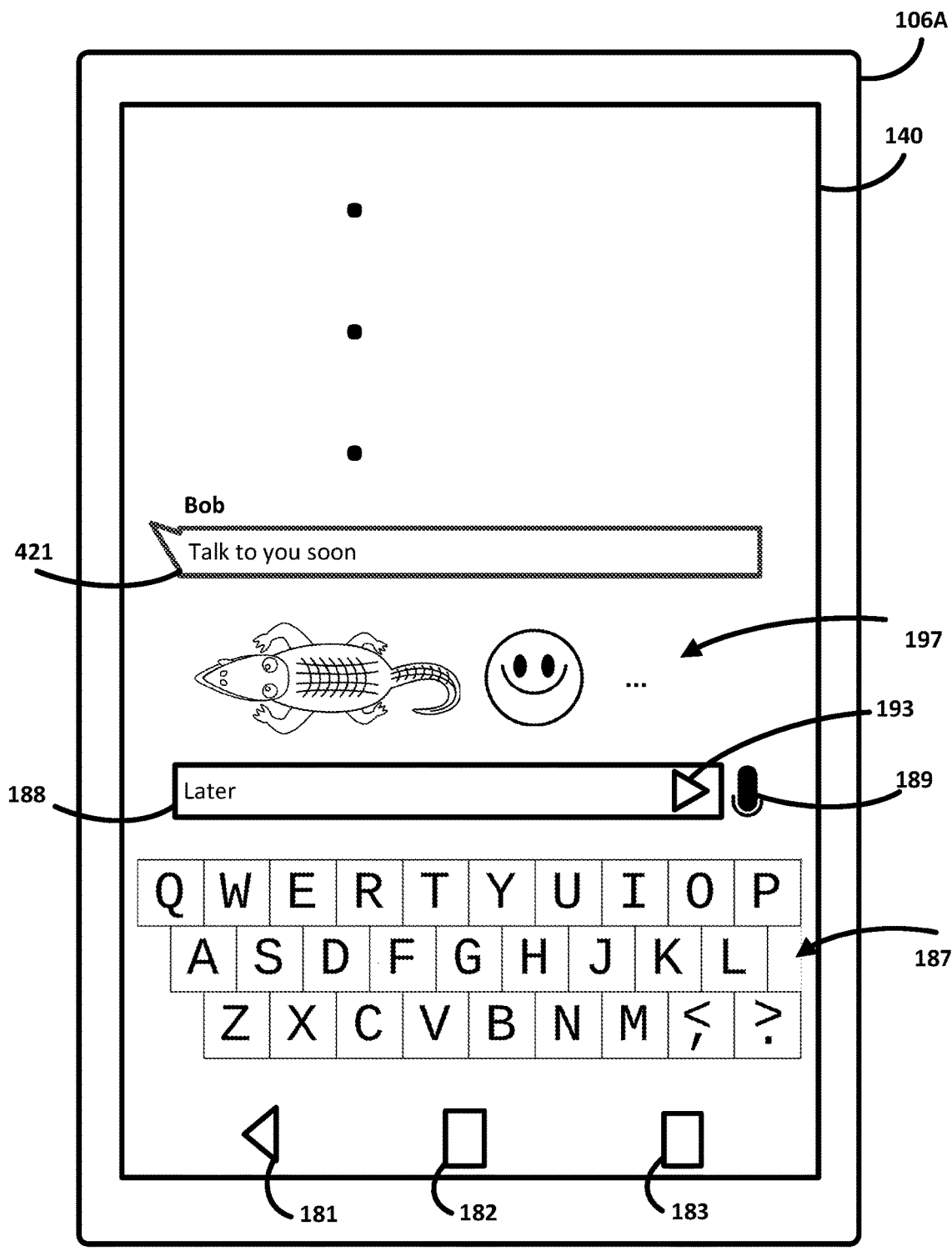
FIG. 4 illustrates the example client computing device of FIG. 3A, and illustrates another example of a dialog and another example of how graphical elements may be presented to the user for potential inclusion in a subsequent communication to be submitted by the user as part of the dialog.

Referring now to FIGS. 3A-4, various examples of implementations of the graphical element system 120 are described. FIGS. 3A, 3B1, 3B2, 3B3, 3C, 3D1, 3D2, and 4 each illustrate the client device 106A and a display screen 140 of the client device 106A (screen 140 may be the user interface output device 106A3 of FIG. 2). The display screen 140 in the various figures displays graphical user interfaces with examples of dialog that involves the user and one or more additional users, and examples of how graphical elements may be presented to the user for inclusion in a subsequent electronic communication to be submitted by the user as part of the dialog, according to implementations disclosed herein. One or more aspects of the graphical element system 120 may be implemented on the client device 106A and/or on one or more computing devices that are in network communication with the client device 106A.

The display screen 140 of FIGS. 3A, 3B1, 3B2, 3B3, 3C, 3D1, 3D2, and 4 further includes a reply interface element 188 that the user may select to generate user interface input via a virtual keyboard and a voice reply interface element 189 that the user may select to generate user interface input via a microphone. In some implementations, the user may generate user interface input via the microphone without selection of the voice reply interface element 189. For example, during the dialog, active monitoring for audible user interface input via the microphone may occur to obviate the need for the user to select the voice reply interface element 189. In some of those and/or in other implementations, the voice reply interface element 189 may be omitted. Moreover, in some implementations, the reply interface element 188 may additionally and/or alternatively be omitted (e.g., the user may only provide audible user interface input and interact with suggested graphical elements and/or textual suggestions). The display screen 140 of FIGS. 3A, 3B1, 3B2, 3B3, 3C, 3D1, 3D2, and 4 also includes system interface elements 181, 182, 183 that may be interacted with by the user to cause the client device 106A to perform one or more actions.

In FIG. 3A, a transcript of a dialog between a user of the client device 106A and at least two additional users (Bob and Tom) is displayed in a graphical user interface. A first additional user (Bob) in the dialog has submitted the electronic communication 321 of "How About Dinner Tomorrow?" and a second additional user (Tom) in the dialog has the electronic communication 322 of "I am in!".

In the example of FIG. 3A, the reply interface element 188 is provided, which the user may select to provide content for an electronic communication to be submitted as part of the dialog. An additional content interface element 187 is also provided, which the user may select to be presented with a group of one or more graphical elements for potential inclusion in an electronic communication to be submitted as part of the dialog.

FIGS. 3B1, 3B2, and 3B3 illustrate an example of how graphical elements may be presented to the user, in response to selection of the additional content interface element 187, and included in a subsequent electronic communication that is submitted by the user as part of the dialog of FIG. 3A.

FIG. 3B1 illustrates the graphical interface after the user has selected the additional content interface element 187 in FIG. 3A. In FIG. 3B1, a group of graphical elements 191 are presented to the user in response to the selection of the additional content interface element 187. Five graphical elements are included in the group 191 and an ellipsis is also shown to the right of the group 191. In some implementations, the ellipsis may be selected to view additional graphical elements, such as those that are also contextually relevant but not included in the initial group and/or those that are not contextually relevant (e.g., to browse all available graphical elements).

One or more of the graphical elements of the group 191 may be selected by the selection engine 130 based on various feature described herein. For example, they may be selected by the selection engine 130 based on submitted communication feature(s) of electronic communications 321 and/or 322 as provided by the submitted communication(s) features engine 122. For instance, the submitted communication feature(s) may include a textual feature of "dinner" based on presence of that term in communication 321. In some implementations, the selection engine 130 may select the "pizza" and "hamburger" graphical elements based on those being assigned graphical element features (e.g., dinner and/or food) that match the textual feature of "dinner." In some implementations, the selection engine 130 may select the "pizza", "hamburger", and/or "wine glass" graphical elements based on applying the "dinner" textual feature to one or more of the content models of database 156 and generating, based on application of the textual feature to the content models, output that indicates that subsequent communications in dialogs that include submitted communications with a "dinner" textual feature often include "food" and "drink" graphical elements and/or "food" and "drink" text. The selection engine 130 may select the "pizza", "hamburger", and "wine glass" graphical elements based on each of those being assigned graphical element features that match one or more aspects of the output.

As another example, the selection engine 130 may select the "OK hand signal" and "smiley" graphical elements based on applying additional or alternative submitted communication features to a content model, and generating, based on application of the submitted communication features to the content model, output that indicates that subsequent communications in dialogs that include those submitted communication features often include "confirmatory" and "happy" graphical elements and/or "confirmatory" and "happy" text. The selection engine 130 may select the "OK hand signal" graphical element based on it being assigned a graphical element feature of "confirmatory" and may select the "smiley face" graphical element based on it being assigned a "happy" graphical element feature.

FIG. 3B2 illustrates the graphical interface after the user has selected the "OK hand signal" graphical element, then selected the "pizza" graphical element, then provided further user interface input (e.g., typed input) of "?". In response to the selections and the further user interface input, the selected graphical elements and the further user interface input are populated sequentially in the reply interface element 188, as part of a subsequent communication being composed by the user. A submission interface element 193 is also provided in FIG. 3B2.

FIG. 3B3 illustrates the graphical interface after the user has selected the submission interface element 193 in FIG. 3B2 to submit, for inclusion in the dialog, the subsequent communication being composed in FIG. 3B1. In FIG. 3B3, the subsequent communication being composed in FIG. 3B1 has been submitted and is included in the dialog. This is illustrated by the updated transcript of the dialog in FIG. 3B3 that now includes the subsequent communication 332.

FIG. 3C illustrates another example of how graphical elements may be presented to the user for potential inclusion in a subsequent communication to be submitted by the user as part of the dialog of FIG. 3A. In some implementations, the graphical interface of FIG. 3C may be presented in lieu of that of FIG. 3B1 in response to selection of the additional content interface element 187. In some implementations, the graphical interface of FIG. 3C may be presented in response to selection of the reply interface element 188 in FIG. 3A in lieu of selection of the additional content interface element 187.

In FIG. 3C, the group of graphical elements 191 is the same as that presented in FIG. 3B. However, in FIG. 3C the interface also includes a virtual keyboard 187 to enable the user to formulate textual input, and includes textual suggestions 194 that are contextually relevant to the dialog. The textual suggestions 194 may be generated, for example, by applying submitted communication features to one or more of the content models of content models database 156 to generate output that indicates text included in subsequent communications in dialogs that include those submitted communication features. In FIG. 3C, the user may use the keyboard 187 to generate textual content for inclusion in the communication to be submitted, may select one of the textual suggestions 194 to include as content in the communication to be submitted, and/or may select one of the graphical elements of the group 191 to include as content. Once the user has formulated the communication to be submitted with desired content, the user may submit it for inclusion in the dialog utilizing the submission interface element 193. As described herein, in some implementations one or more of the textual suggestions 194 may be utilized as a feature for selecting one or more of the graphical elements 191. For example, the "OK hand signal" graphical element and/or the "happy" graphical element may be selected based at least in part on being indexed by the phrase "sounds good" and/or the term "good".

FIGS. 3D1 and 3D2 illustrate yet another example of how graphical elements may be presented to the user for potential inclusion in a subsequent communication to be submitted by the user as part of the dialog of FIG. 3A. In some implementations, the graphical interface of 3D1 may be presented in response to selection of the reply interface element 188 in FIG. 3A. In FIG. 3D, the user has used the virtual keyboard 187 to provide textual input of "Yes, what can I bring?" in a subsequent communication to be submitted in the dialog.

FIG. 3D2 illustrates an example of a group of graphical elements 195 that may be presented in response to user selection of the additional content interface element 187 after providing the textual input of FIG. 3D1. The group of graphical elements 195 differs from the group 191 (FIGS. 3B1, 3B2, 3C) based on being selected while also taking into account subsequent communication features that are based on the textual input of "Yes, what can I bring?". For example, the selection engine 130 may utilize one or more subsequent communication features provided by subsequent communication features engine 126 in selecting the graphical elements for inclusion in the group 195. Such utilization of the subsequent communication features causes the display prominence of the "wine glass" graphical element to be promoted and causes new "pie" and "salad" graphical elements to be included in the group 195. The user may optionally select one or more of the graphical elements to include the selected graphical elements in the communication to be submitted, and submit the communication through selection of the submission interface element 193.

In some implementations, in advance of providing the textual input of "Yes, what can I bring?" in FIG. 3D1, the user may first select the additional content interface element 187 and be presented with the group 191 of FIGS. FIGS. 3B1, 3B2, 3C. In some of those implementations, in response to providing the textual input of "Yes, what can I bring?" in FIG. 3D1, the group 191 may be supplanted with the group 195 (FIG. 3D2) based on consideration of subsequent communication features that are based on that textual input. Also, in some implementations, further submitted communication(s) from additional users that are submitted as part of the dialog during composition of a subsequent communication of the user may be utilized to update a provided group of graphical elements (i.e., by further taking into account submitted communication features of the further submitted communication(s)).

FIG. 4 illustrates the example client computing device of FIG. 3A, and illustrates another example of dialog and another example of how graphical elements may be presented to the user for potential inclusion in a subsequent communication to be submitted by the user as part of the dialog. In FIG. 4, a transcript of a dialog between a user of the client device 106A and at least one additional user (Bob) is displayed in a graphical user interface. An additional user (Bob) in the dialog has submitted the electronic communication 421 of "Talk to you soon".

The user has used the virtual keyboard 187 to provide, in the reply interface element 188, textual input of "Later" as content for a subsequent electronic communication to be submitted as part of the dialog. A group of graphical elements 197 is presented to the user and includes an "alligator" graphical element and a "smiley" graphical element. In some implementations, the group 197 may be presented to the user without explicit user interface input requesting suggested graphical elements be provided. In some of those implementations, the group 197 may be provided based on the selection engine 130 determining that scores associated with one or more of the graphical elements of the group satisfy a threshold. In some implementations, the selection engine 130 may determine the group 197 based on submitted communication feature(s) of communication 421, subsequent communication feature(s) based on the textual input "Later", and based on sentiment of the user and/or of "Bob" that indicates they are "jovial". For example, the "alligator" graphical element may be indexed with graphical element features that indicate it has a strong weight for subsequent communications that include the term "later", has a strong weight for submitted communications that include a "departing remark" such as "talk to you soon", and has a strong weight for "jovial" sentiments.

Figure 5A:
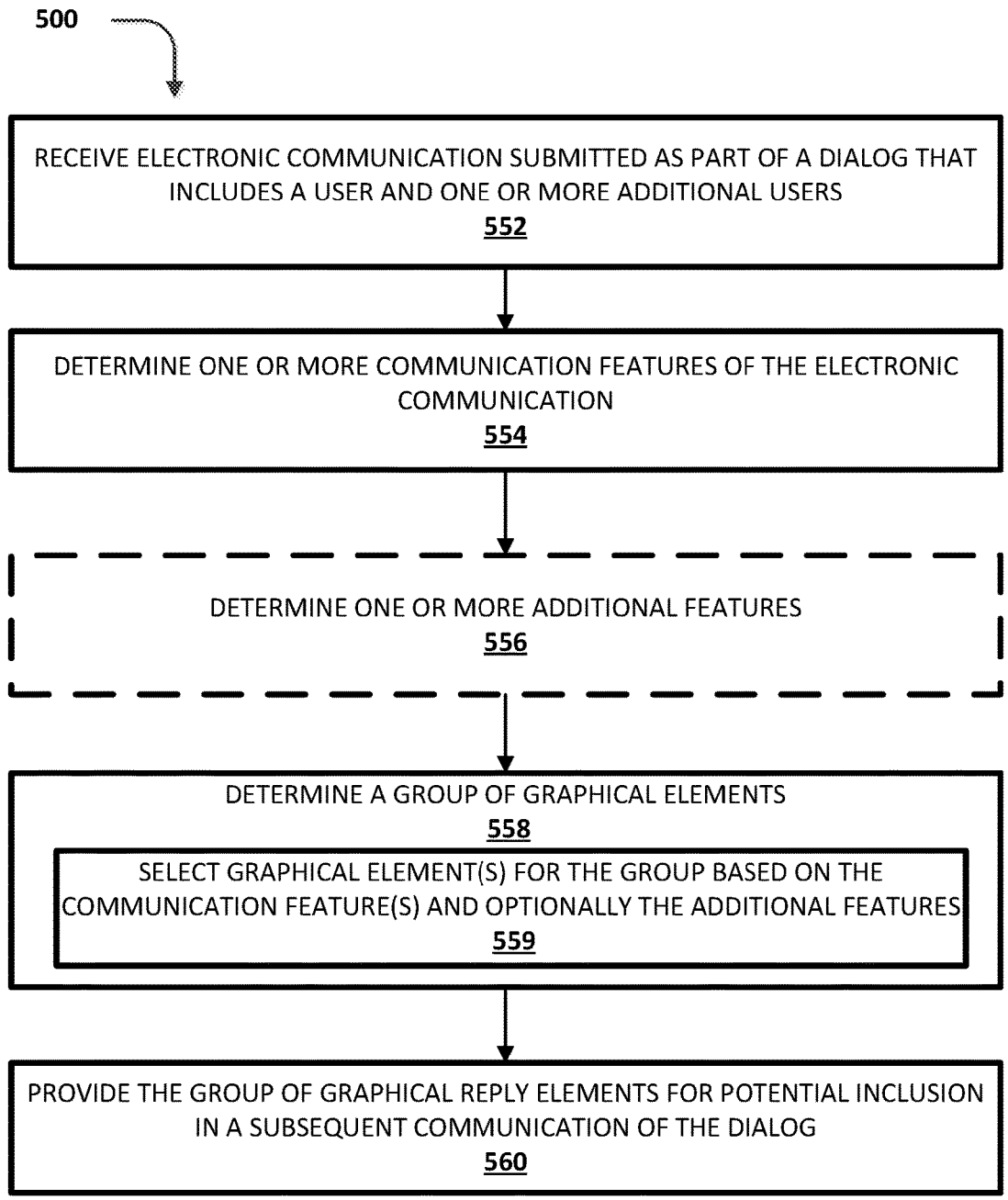
FIG. 5A is a flowchart illustrating an example method of providing a group of graphical elements for inclusion in a dialog according to implementations disclosed herein.

FIG. 5A is a flowchart illustrating an example method 500 of providing a group of graphical elements for inclusion in a dialog according to implementations disclosed herein. For convenience, the operations of the flow chart are described with reference to a system that performs the operations. This system may include various components of various computer systems, such as one or more components of graphical element system 120. Moreover, while operations of method 500 are shown in a particular order, this is not meant to be limiting. One or more operations may be reordered, omitted or added.

At block 552, the system receives an electronic communication submitted as part of a dialog that includes a user and one or more additional users.

At block 554, the system determines one or more communication features of the electronic communication. For example, the system may determine one or more submitted communication features of one or more submitted communications that have been submitted as part of the dialog. Also, for example, the system may additionally or alternatively determine one or more subsequent communication features based on content (if any) that has been provided by the user for inclusion in a subsequent communication to submit as part of the dialog.

At optional block 556, the system determines one or more additional features. For example, the system may determine current state feature(s) that indicate the current state of one or more dynamic states associated with user(s) engaged in the dialog. Also, for example, the system may additionally or alternatively determine historical usage features that indicate historical usage, of the user, of one or more graphical elements.

At block 558, the system determines a group of graphical elements for inclusion in a subsequent communication of the user. In some implementations, the system performs block 559 as part of performing block 558. At block 559, the system selects one or more graphical elements for the group based on the communication feature(s) determined at block 554 and optionally based on the additional feature(s) determined at block 556. Two examples of block 559 are illustrated in FIGS. 5B and 5C.

At block 560, the system provides the group of graphical elements for potential inclusion in a subsequent communication of the dialog.

Multiple iterations of blocks 552, 554, 556, 558, and 560 may occur during a dialog to enable graphical elements to be adapted to various changes in context of the dialog that may occur throughout the dialog.

Figure 5B:
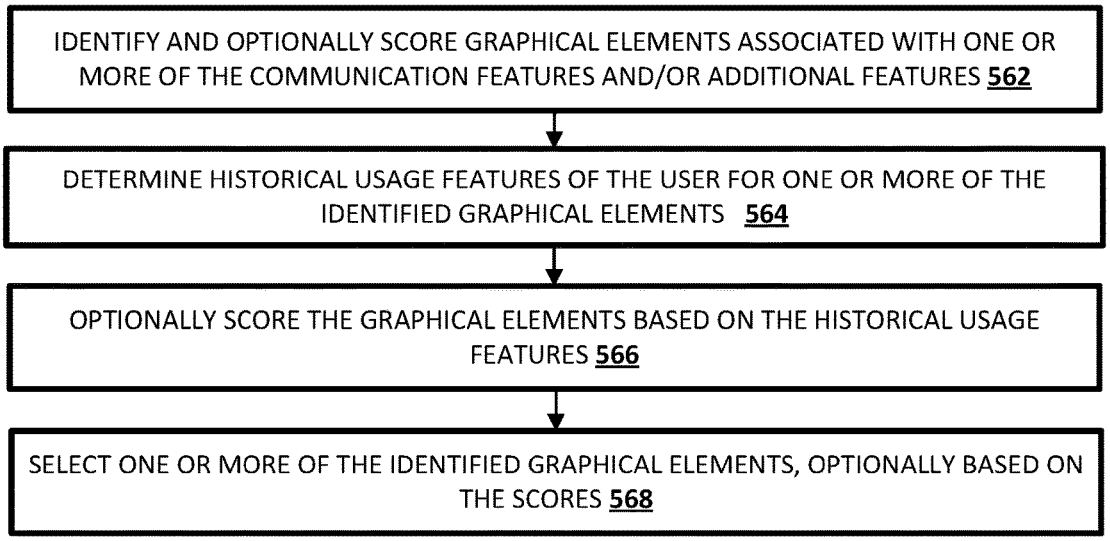
FIG. 5B is a flowchart illustrating an example of one block of the flowchart of FIG. 5A.
Figure 5C:
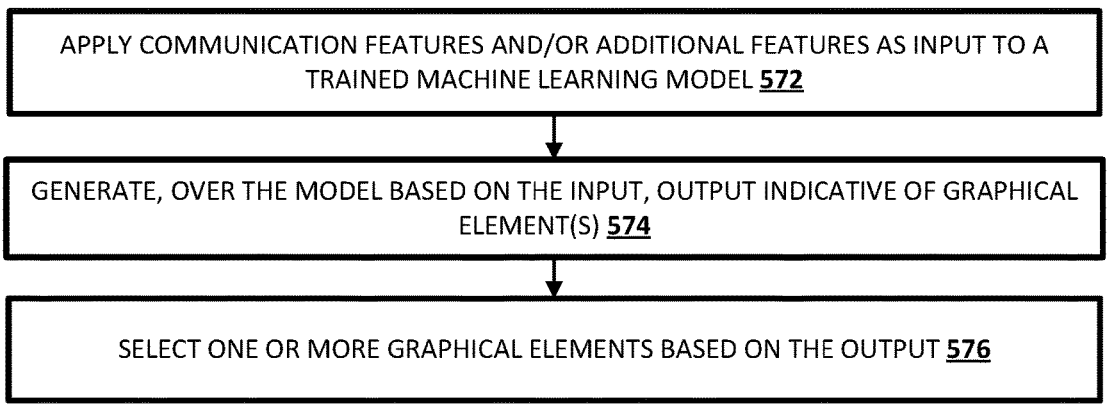
FIG. 5C is a flowchart illustrating another example of the one block of the flowchart of FIG. 5A.

FIG. 5B is a flowchart illustrating an example of implementations of block 559 of the method 500 in additional detail. While the operations of the flowchart of FIG. 5B are shown in a particular order, this is not meant to be limiting. One or more operations may be reordered, omitted or added.

At block 562, the system identifies and optionally scores graphical elements that are associated with one or more of the communication features of block 554 (FIG. 5) and/or one or more of the additional features of block 556 (FIG. 5). For example, the system may identify graphical elements that are indexed by (e.g., include assigned graphical element features that correspond to) one or more of the features. The system may score each of the graphical elements based on a quantity of the features with which the graphical element is associated and/or based on optional weights assigned to the associations between the matching features and the graphical element.

At block 564, the system determines historical usage features of the user for one or more of the graphical elements identified at block 562. The historical usage features may be features determined at block 556 of FIG. 5. For example, for a given graphical element the system may determine: a frequency of use by the user of the given graphical element; a frequency of use by the user of all graphical elements sharing one or more graphical element characteristics with the given graphical element; and/or a frequency of use by the user of graphical elements from a cohesive graphical element pack to which the given graphical element belongs.

At block 566, the system optionally scores the identified graphical elements based on the historical usage features.

The system may modify the optional score determined at block 562 and/or may generate new scores based on the historical usage features. For example, the system may assign more prominent scores to graphical element(s) associated with at least a threshold degree of past usage, than it assigns to other graphical elements that do not have the threshold degree of past usage. Also, for example, the system may modify the optional score determined at block 562 by promoting the scores of graphical element(s) whose historical usage feature(s) indicate at least a threshold degree of past usage by the user.

At block 568, the system selects one or more of the identified graphical elements, optionally based on the scores. For example, the system may select the N most prominently scored graphical element for inclusion in a group to be initially displayed to a user. N may be selected based on various factors such as display properties of a client device on which the graphical elements will be provided, the scores themselves (e.g., only graphical elements having scores that satisfy a threshold will be selected), etc.

FIG. 5C is a flowchart illustrating another example of implementations of block 559 of the method 500 in additional detail. While the operations of the flowchart of FIG. 5C are shown in a particular order, this is not meant to be limiting. One or more operations may be reordered, omitted or added.

At block 572, the system applies communication features and/or additional features as input to a trained machine learning model. For example, the trained machine learning model may embed relationships between features of electronic communications of a dialog and one or more graphical element features and/or one or more features of text.

At block 574, the system generates, over the model based on the input applied at block 572, output that is indicative of one or more graphical elements. For example, the output may indicate one or more graphical element features and/or one or more features of text. In some implementations, the output may also optionally indicate weights for one or more of the indicated features.

At block 576, the system selects one or more graphical elements based on the output of block 574. For example, the system may select graphical elements that are indexed by, or otherwise associated with, graphical element features corresponding to feature(s) indicated by the output of block 574. In some implementations, optional weights indicated in the output for the features may be utilized to select one or more of the graphical elements. For example, those graphical elements associated with features having stronger weights may be more likely to be selected than those graphical elements associated only with features having weaker weights. For instance, scores may be determined for each of the graphical elements based on the weights and the scores utilized to select some of the graphical elements. In some implementations, the scores may additionally or alternatively be determined based on historical usage features as described with respect to blocks 564 and 566 of FIG. 5B.

Although FIG. 5B and FIG. 5C are illustrated as different figures, in some implementations one or more of the blocks of FIG. 5B and one or more of the blocks of FIG. 5C may both be performed in a given iteration of block 559 of method 500. For example, some graphical elements may be selected based on blocks of FIG. 5B and other graphical elements may be selected based on blocks of FIG. 5C. Also, for example, scores generated based on blocks of FIG. 5B and scores generated based on blocks of FIG. 5C may be combined and the combined scores utilized to select a subset of the graphical elements identified based on blocks of FIG.

5B and blocks of FIG. 5C. In other implementations, a given iteration of block 559 may include only blocks of FIG. 5B or only blocks of FIG. 5C.

Figure 6:
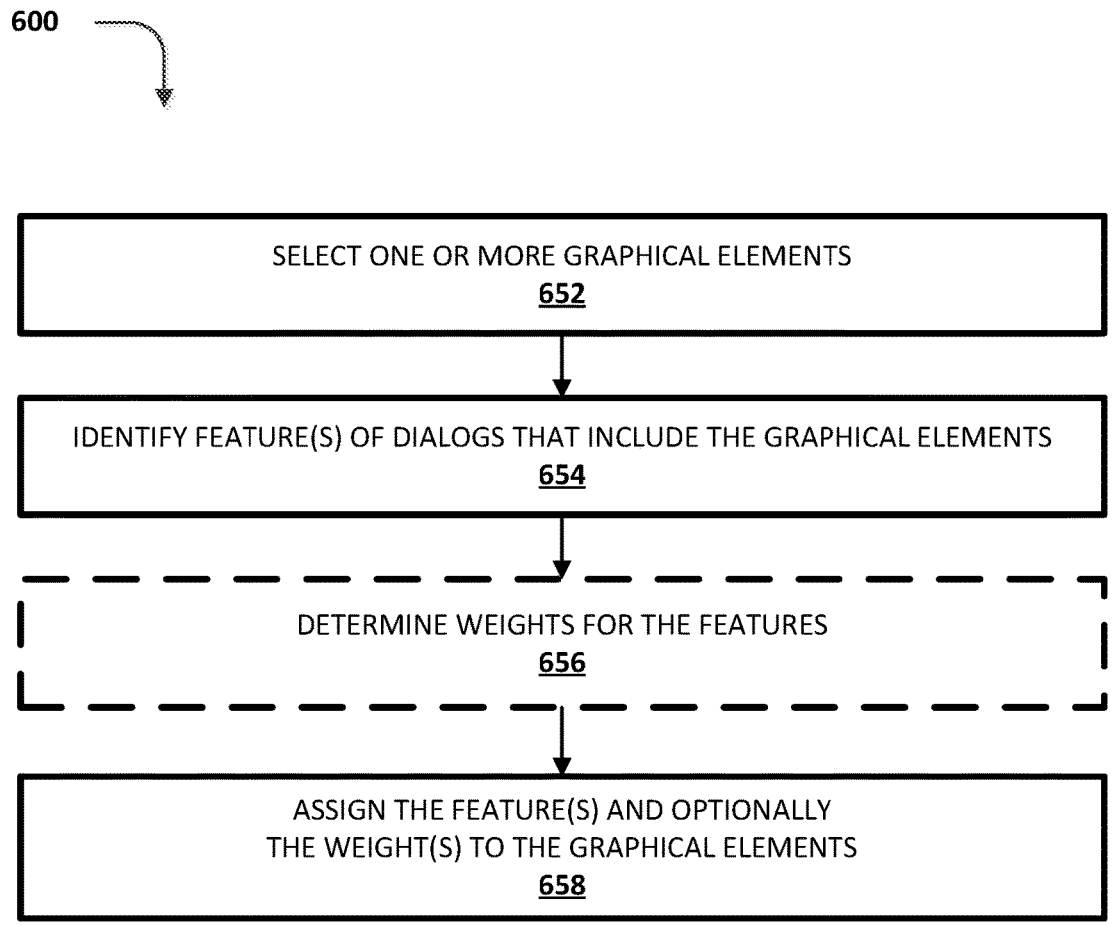
FIG. 6 is a flowchart illustrating an example method of assigning features to graphical elements.

FIG. 6 is a flowchart illustrating an example method 600 of assigning features to graphical elements. For convenience, the operations of the flow chart are described with reference to a system that performs the operations. This system may include various components of various computer systems, such as graphical element features engine 137. Moreover, while operations of method 600 are shown in a particular order, this is not meant to be limiting. One or more operations may be reordered, omitted or added.

At block 652, the system selects one or more graphical elements. For example, the system may select a single graphical element or may select a group of graphical elements. When the system selects the group of graphical elements, that group may be selected based on the graphical elements of the group all belonging to the same cohesive pack, and/or based on the graphical elements of the group all having one or more other already assigned graphical element features in common.

At block 654, the system identifies features of dialogs that include the graphical elements. For example, the system may identify features of communications of the dialogs, where the graphical elements were included in those communications. Also, for example, the system may additionally or alternatively identify features of communications of the dialogs, where the graphical elements were not included in those communications but, instead, were included in subsequent communications of the dialogs. As yet another example, the system may additionally or alternatively identify user state features based on communications of the dialogs.

At block 656, the system optionally determines weights for the features. For example, the system may determine a weight for a given feature based on its quantity of occurrences in the dialogs. For instance, for a graphical element that is a depiction of an alligator, the system may determine it is included with the term "later" in 500 communications of the dialogs, and that it is included with the term "Florida" in 300 communications of the dialogs. Based on its occurrence with "later" in a greater quantity of communications than its occurrence with "Florida", a greater weight may be determined for the feature of "later" may than a weight determined for a feature of "Florida".

At block 658, the system assigns, to the graphical elements, one or more of the features and optionally the weights. For example, the system may assign, to the graphical elements, those features having at least a threshold weight. In some implementations, the features may optionally be assigned with an indication of parameters for the feature. For example, where a feature is based on communications in which the graphical elements were included, that feature may be assigned with an indication that it is associated with communications for which the graphical element is to be included. For instance, it may be assigned with an indication that indicates that feature is relevant to the graphical element only when that feature is included in a communication for which the graphical element is to be provided for inclusion. Also, for example, where a feature is based on communications of a dialog in which the graphical elements were included in subsequent communications of the dialog, that feature may be assigned with an indication that it is associated with submitted communications of a dialog. For instance, it may be assigned with an indication that indicates that feature is relevant to the graphical element only when that feature is included in an already submitted communication of a dialog, and the graphical element is to be provided for inclusion in a subsequent communication of the dialog.

Multiple iterations of method 600 may be performed to assign features to a variety of different graphical elements.

Figure 7:
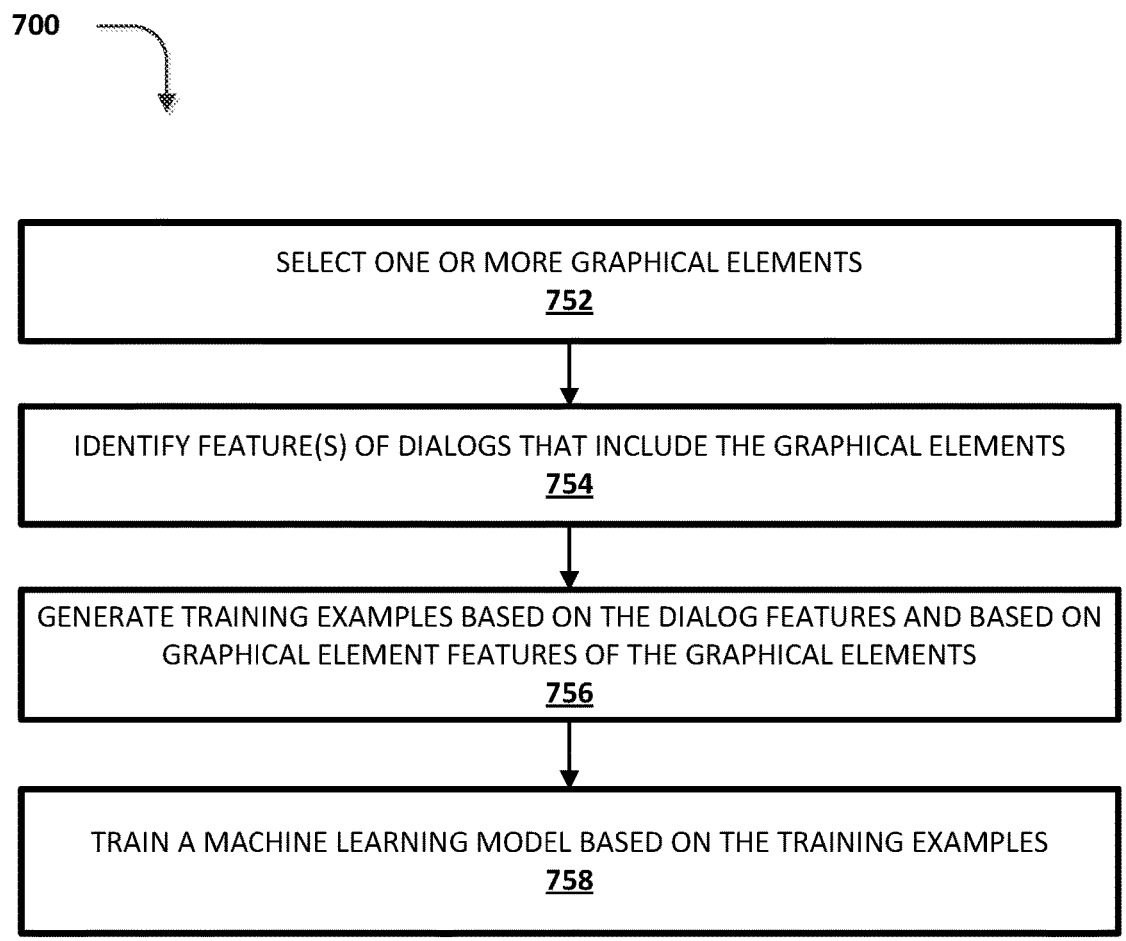
FIG. 7 is a flowchart illustrating an example method of training a machine learning content model.

FIG. 7 is a flowchart illustrating an example method 700 of training a machine learning content model. For convenience, the operations of the flow chart are described with reference to a system that performs the operations. This system may include various components of various computer systems, such as content model training engine 135. Moreover, while operations of method 700 are shown in a particular order, this is not meant to be limiting. One or more operations may be reordered, omitted or added.

At block 752, the system selects one or more graphical elements. For example, the system may select all graphical elements available to the system or a subset of graphical elements available to the system.

At block 754, the system identifies features of dialogs that include the graphical elements. For example, the system may identify features of communications of the dialogs, where the graphical elements were included in those communications. Also, for example, the system may additionally or alternatively identify features of communications of the dialogs, where the graphical elements were not included in those communications but, instead, were included in subsequent communications of the dialogs. As yet another example, the system may additionally or alternatively identify user state features based on communications of the dialogs.

At block 756, the system generates training examples based on the dialog features and based on graphical element features of the graphical elements. For example, each of the training examples may include: training example input based on features from one of the dialogs and training example output based on graphical element features of one or more graphical elements included in the dialog.

At block 758, the system trains a machine learning model based on the training examples. For example, the system may train the machine learning model based on application of the training example input of the training examples and backpropagation based on the training example output of the training examples.

As one particular example of the method 700, assume a machine learning model with an input layer, multiple hidden layers, and an output layer that is a vector of 256 different graphical element features.

A first training example may be generated based on presence of a first graphical element in a first dialog. The training example input of the first training example may include one or more features of the first dialog, such as communication features for the communication that includes the first graphical element and/or communication features of one or more other communications of the first dialog. The training example output of the first training example may be the vector of 256 different graphical element features, with the values for each of the graphical element features being assigned based on stored assignments of those graphical element features to the first graphical element. For instance, if the first graphical element has only 5 of the 256 different graphical element features assigned, the training example output may include "1s" (or other "present" value(s)) for those 5 graphical element features and may include "0s" (or other "absent" value(s)) for the 251 other graphical element features. In some implementations, the "present" values may optionally be weighted based on, for example, corresponding weights of the assignments of those 5 graphical element features for the first graphical element.

A second training example may be generated based on presence of a second graphical element in a second dialog. The training example input of the second training example may include one or more features of the second dialog, such as communication features for the communication that includes the first graphical element and/or communication features of one or more other communications of the second dialog. The training example output of the second training example may be the vector of 256 different graphical element features, with the values for each of the graphical element features being assigned based on stored assignments of those graphical element features to the second graphical element. For instance, if the second graphical element has only 4 of the 256 different graphical element features assigned, the training example output may include "1s" (or other "present" value(s)) for those 4 graphical element features and may include "0s" (or other "absent" value(s)) for the 252 other graphical element features. In some implementations, the "present" values may optionally be weighted based on, for example, corresponding weights of the assignments of those 4 graphical element features for the second graphical element.

Additional training examples may be generated in a similar manner based on additional graphical elements and/or dialogs. Once trained based on the training examples, features of a new dialog may be applied as input to the trained machine learning model, and output generated over the model based on the applied input. The output will include values for each of the 256 different graphical element features. Each value indicates the likelihood that, given the applied features of the new dialog, that the corresponding graphical element feature is relevant to the new dialog. Those values may then be utilized to select one or more graphical elements for providing for inclusion in a subsequent message to be submitted as part of the dialog. For example, assume 20 particular values of the 256 values satisfy a threshold value. Graphical elements may be selected that are assigned the greatest quantity of those 20 particular values.

Figure 8:
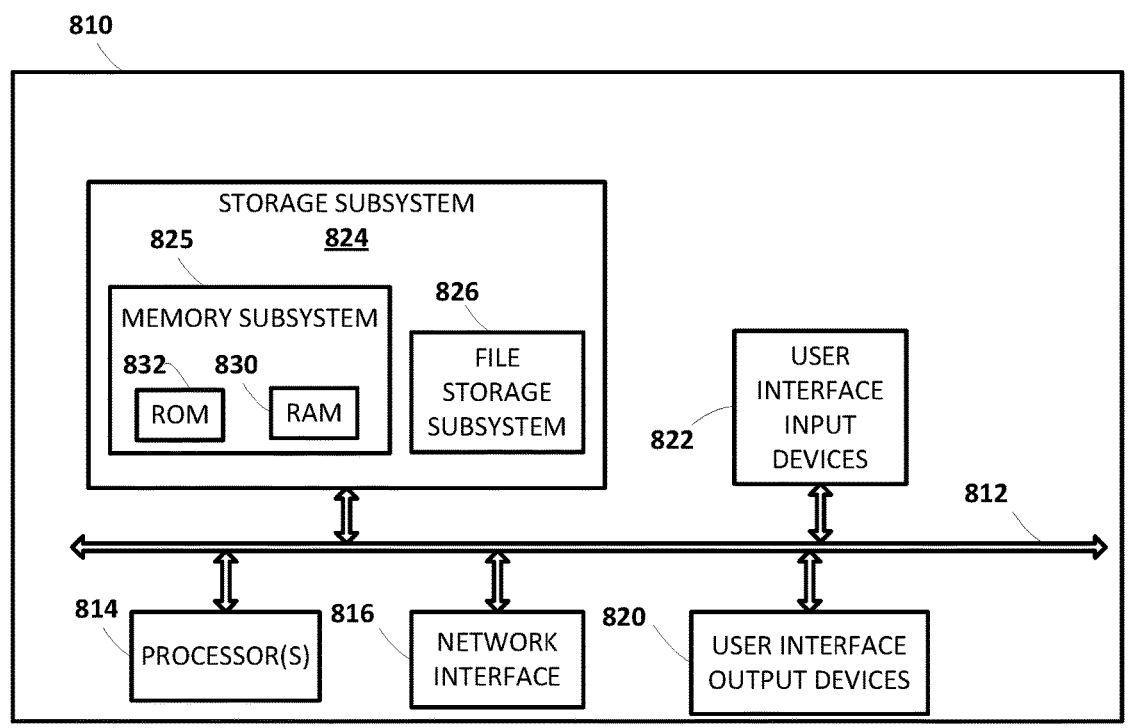
FIG. 8 illustrates an example architecture of a computing device.

FIG. 8 is a block diagram of an example computing device 810 that may optionally be utilized to perform one or more aspects of techniques described herein. In some implementations, one or more of a client computing device, automated assistant 120, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods of FIGS. 5A, 5B, 5C, 6, and/or 7.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which certain implementations discussed herein may collect or use personal information about users (e.g., user data extracted from other electronic communications, information about a user's social network, a user's location, a user's biometric information, and a user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for whom personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   receiving an electronic communication submitted as part of a dialog that includes a user and one or more additional users, the electronic communication being based on user interface input generated by an additional user of the one or more additional users, via one or more user interface input devices of an additional user computing device of the additional user;
   determining at least one communication feature of the electronic communication, wherein the at least one communication feature is based on one or more terms of a plurality of terms of the electronic communication;
   determining a first current state feature that indicates a first current state of the user and a second current state feature that indicates a second current state of the additional user, wherein the first current state includes a first sentiment of the user and the second current state includes a second sentiment of the additional user, wherein determining the first current state feature and the second current state feature includes determining a magnitude of the first sentiment and a magnitude of the second sentiment;
   determining a combined current state feature based on the first current state feature and the second current state feature, wherein the combined current state feature is based on the magnitude of the first sentiment and the magnitude of the second sentiment; and
   prior to receipt of textual input provided by the user for a subsequent electronic communication of the user to be submitted as part of the dialog:
      determining a group of one or more graphical elements for inclusion in the subsequent electronic communication, wherein determining the group of one or more graphical elements comprises:
         selecting, from candidate graphical elements, at least one graphical element to include in the group, wherein selecting the at least one graphical element is based on the at least one communication feature of the electronic communication and on the combined current state feature; and
         providing the group of one or more graphical elements for potential inclusion in the subsequent electronic communication, wherein the group of one or more graphical elements is provided for presentation via a display of a user computing device of the user.

2. The method of claim 1, further comprising:
   identifying user interface interaction with a user interface element, the user interface element graphically presented to the user via the display in combination with a presentation of the electronic communication;
   wherein providing the group of one or more graphical elements is in response to identifying the user interface interaction with the user interface element.

3. The method of claim 1, wherein the at least one communication feature includes at least one of: text occurring in a particular portion of the electronic communication, a time the electronic communication was sent or received, a number of user participants in the dialog, or labels applied to text of the electronic communication.

4. The method of claim 1, wherein the at least one communication feature further comprises at least one non-textual feature that is based at least in part on one or more signals that are in addition to the terms of the electronic communication.

5. The method of claim 1, further comprising:
   determining at least one additional communication feature of an additional electronic communication of the dialog;
   wherein selecting the at least one graphical element is further based on the at least one additional communication feature.

6. The method of claim 1, further comprising:
   identifying a historical usage feature for the at least one graphical element, wherein the historical usage feature includes a quantity or frequency of past usage by the user of the at least one graphical element and of other graphical elements sharing one or more graphical element features with the at least one graphical element, wherein the one or more graphical element features include at least one of: a descriptor of content in the at least one graphical element, an identifier of an entity associated with the at least one graphical element, a term of a prior dialogue in which the at least one graphical element was included, or a user state associated with the at least one graphical element;
   wherein selecting the at least one graphical element is further based on the historical usage feature.

7. The method of claim 1, wherein selecting the at least one graphical element based on the at least one communication feature comprises:

determining a graphical element feature based on the at least one communication feature, the graphical element feature being assigned to the at least one graphical element and being assigned to a plurality of other graphical elements, wherein the graphical element feature includes at least one descriptor of content included in the at least one graphical element; and selecting the at least one graphical element to include in the group based on the at least one graphical element being associated with a greater degree of historical usage, by the user, than other graphical elements.

8. The method of claim 7, wherein the at least one graphical element is included in a cohesive pack of graphical elements and wherein the historical usage of the at least one graphical element is based on the historical usage, by the user, of the graphical elements of the cohesive pack.

9. The method of claim 1, wherein selecting the at least one graphical element based on the at least one communication feature comprises:

applying input to a trained machine learning model stored in one or more computer readable media, the input comprising the at least one communication feature;

generating, over the model and based on the input, output that indicates one or more graphical element features; and selecting the at least one graphical element based on the one or more graphical element features being assigned to the at least one graphical element.

10. The method of claim 9, wherein the output that indicates one or more graphical element features includes one or more terms and wherein selecting the at least one graphical element based on the one or more graphical element features being assigned to the graphical element comprises selecting the at least one graphical element based on it being indexed by at least one of the one or more terms.

11. The method of claim 9, further comprising:

generating the trained machine learning model based on a plurality of training examples derived from past user dialogs, each of the training examples including:

training example input based on communication features of a corresponding original electronic communication, and training example output based on text of a corresponding reply electronic communication that is a reply to the corresponding original electronic communication;

wherein generating the trained machine learning model comprises training the trained machine learning model based on application of the training example input of the training examples and backpropagation based on the training example output of the training examples.

12. The method of claim 9, further comprising determining at least one third current state feature that indicates a third current state of the user or the additional user, wherein the third current state includes a physical location of a user computing device of the user or of the additional user.

13. The method of claim 1, wherein the at least one communication feature includes the one or more terms and wherein selecting the at least one graphical element based on the at least one communication feature comprises:

selecting the at least one graphical element based on it being indexed by at least one of the one or more terms.

14. The method of claim 1, further comprising:

after providing the group of one or more graphical elements for potential inclusion in the subsequent electronic communication:

receiving textual input provided by the user for the subsequent electronic communication, the textual input being based on user interface input generated by the user via one or more user interface input devices of the user computing device;

determining a modified group of graphical elements based on the textual input and based on the at least one communication feature; and providing the modified group of graphical elements for potential inclusion in the subsequent electronic communication in combination with the textual input.

15. A method implemented by one or more processors, comprising:

receiving an electronic communication submitted as part of a dialog that includes a user and one or more additional users, the electronic communication being based on user interface input generated by an additional user of the one or more additional users via one or more user interface input devices of an additional user computing device of the additional user;

determining at least one communication feature of the electronic communication, wherein the at least one communication feature is based on one or more terms of a plurality of terms of the electronic communication;

receiving textual input provided by the user for a subsequent electronic communication, of the user, to be submitted as part of the dialog;

determining a first current state feature that indicates a first current state of the user and a second current state feature that indicates a second current state of the additional user, wherein the first current state includes a first sentiment of the user and the second current state includes a second sentiment of the additional user, wherein determining the first current state feature and the second current state feature includes determining a magnitude of the first sentiment and a magnitude of the second sentiment;

determining a combined current state feature based on the first current state feature and the second current state feature, wherein the combined current state feature is based on the magnitude of the first sentiment and the magnitude of the second sentiment;

determining a group of one or more graphical elements for inclusion in the subsequent electronic communication, wherein determining the group of one or more graphical elements comprises:

selecting, from candidate graphical elements, at least one graphical element to include in the group, wherein selecting the at least one graphical element is based on the textual input and is based on the at least one communication feature and on the combined current state feature; and providing the group of one or more graphical elements for potential inclusion in the subsequent electronic communication, wherein the group of one or more graphical elements is provided for presentation via a display of a user computing device of the user.

16. The method of claim 15, wherein providing the group of one or more graphical elements is in response to receiving the textual input and occurs without further user interface input that explicitly requests provision of graphical elements, wherein the communication feature includes the one or more terms and wherein selecting the at least one graphical element based on the at least one communication feature comprises:

selecting the at least one graphical element based on the at least one graphical element being indexed by at least one of the one or more terms.

17. A system, comprising:

memory storing instructions;

one or more processors operable to execute the instructions stored in the memory to perform operations comprising:

receiving an electronic communication submitted as part of a dialog that includes a user and one or more additional users, the electronic communication being based on user interface input generated by an additional user of the one or more additional users, via one or more user interface input devices of an additional user computing device of the additional user;

determining at least one communication feature of the electronic communication, wherein the at least one communication feature is based on one or more terms of a plurality of terms of the electronic communication;

determining a first current state feature that indicates a first current state of the user and a second current state feature that indicates a second current state of the additional user, wherein the first current state includes a first sentiment of the user and the second current state includes a second sentiment of the additional user, wherein determining the first current state feature and the second current state feature includes determining a magnitude of the first sentiment and a magnitude of the second sentiment;

determining a combined current state feature based on the first current state feature and the second current state feature, wherein the combined current state feature is based on the magnitude of the first sentiment and the magnitude of the second sentiment; and prior to receipt of textual input provided by the user for a subsequent electronic communication of the user to be submitted as part of the dialog:

determining a group of one or more graphical elements for inclusion in the subsequent electronic communication, wherein determining the group of one or more graphical elements comprises:

selecting, from candidate graphical elements, at least one graphical element to include in the group, wherein selecting the at least one graphical element is based on the at least one communication feature of the electronic communication and on the combined current state feature; and providing the group of one or more graphical elements for potential inclusion in the subsequent electronic communication, wherein the group of one or more graphical elements is provided for presentation via a display of a user computing device of the user.

* * * * *